United States Patent
Nishio et al.

(10) Patent No.: US 7,978,417 B2
(45) Date of Patent: Jul. 12, 2011

(54) EYEPIECE OPTICAL SYSTEM AND ELECTRONIC VIEW FINDER INCORPORATING THE SAME

(75) Inventors: Akinori Nishio, Hachioji (JP); Keitaro Yokohama, Hachioji (JP); Daichi Murakami, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/931,126

(22) Filed: Jan. 24, 2011

(65) Prior Publication Data

US 2011/0122502 A1  May 26, 2011

Related U.S. Application Data

(62) Division of application No. 12/800,126, filed on May 7, 2010.

(30) Foreign Application Priority Data

May 18, 2009 (JP) ................................. 2009-119472

(51) Int. Cl.
  *G02B 25/00* (2006.01)
  *G03B 13/10* (2006.01)
(52) U.S. Cl. ........ 359/644; 359/683; 359/689; 359/690; 359/716; 359/784; 359/785; 396/378; 396/379; 396/382; 396/383
(58) Field of Classification Search .......... 359/643–647, 359/683, 689, 690, 716, 784, 785; 396/378, 396/379, 382, 383
See application file for complete search history.

(56) References Cited

U.S. PATENT DOCUMENTS

| 6,847,494 | B2 * | 1/2005 | Cahall | 359/690 |
| 7,391,968 | B2 * | 6/2008 | Takato | 396/382 |
| 2010/0290129 | A1 * | 11/2010 | Nishio et al. | 359/645 |

FOREIGN PATENT DOCUMENTS

| JP | 2001-272610 | 10/2001 |
| JP | 2002-048985 | 2/2002 |
| JP | 2002-082290 | 3/2002 |
| JP | 2002-365562 | 12/2002 |
| JP | 2004-258653 | 9/2004 |
| JP | 2007-225835 | 9/2007 |
| JP | 2007-264179 | 10/2007 |
| JP | 2008-107380 | 5/2008 |
| JP | 2008-203290 | 9/2008 |

* cited by examiner

*Primary Examiner* — Evelyn A. Lester
(74) *Attorney, Agent, or Firm* — Kenyon & Kenyon LLP

(57) ABSTRACT

The invention relates to an eyepiece optical system that, albeit being of small size, works in favor of gaining an angle of field and optical performance, and an electronic view finder incorporating such an eyepiece optical system. Specifically, the invention is characterized by comprising, in order from an object side to an exit side thereof, a first lens group that is a single lens that has positive refracting power and is in a meniscus configuration concave on its object side, a second lens group that is a single lens that has negative refracting power and is in a meniscus configuration concave on its object side, and a third lens group that is a single lens that has positive refracting power, wherein an object-side concave lens surface in the first lens group is an aspheric surface, an object-side concave lens surface in the second lens group is an aspheric surface, and an exit-side lens surface in the third lens group is an aspheric surface.

Alternatively, the eyepiece optical system is characterized by comprising a first lens group having a curved refractive surface, and a rear lens group having positive refracting power, wherein while the first lens group remains fixed, the rear lens group moves along an optical axis with satisfaction of given conditions, thereby implementing diopter adjustment.

9 Claims, 29 Drawing Sheets

Example 1

(a) −1diopter (b) +1diopter (c) −3diopter

Example 2

(a) −1diopter (b) +1diopter (c) −3diopter

Example 3

(a) −1diopter (b) +1diopter (c) −3diopter

Example 4

(a) −1diopter (b) +1diopter (c) −3diopter

Example 5

(a) −1diopter (b) +1diopter (c) −3diopter

Example 6

(a) −1 diopter (b) +1 diopter (c) −3 diopter

Example 7

(a) −1diopter (b) +4diopter (c) −4diopter

Example 8

(a) −1diopter (b) +4diopter (c) −4diopter

Example 9

(a) −1diopter (b) +4diopter (c) −4diopter

Example 10

(a) −1diopter (b) +4diopter (c) −4diopter

Example 11

(a) −1diopter (b) +4diopter (c) −4diopter

Example 12

(a) −1diopter (b) +4diopter (c) −4diopter

Example 13

(a) −1diopter (b) +4diopter (c) −4diopter

Example 14

(a) −1diopter (b) +2.6diopter (c) −3.8diopter

US 7,978,417 B2

EYEPIECE OPTICAL SYSTEM AND ELECTRONIC VIEW FINDER INCORPORATING THE SAME

CROSS REFERENCE TO RELATED APPLICATION

This application is a divisional of U.S. patent application Ser. No. 12/800,126 filed on May 7, 2010, which claims priority to Japanese Patent Application No. 2009-119472 filed on May 18, 2009, each of which is expressly incorporated herein in its entirety by reference thereto.

BACKGROUND OF THE INVENTION

The present invention relates generally to an eyepiece optical system adapted to enlarge an object to view it with the naked eye. More specifically, the invention relates to an electronic view finder adapted to enlarge an image shown on a display plane of an image display apparatus to view it with the naked eye.

Among eyepiece optical systems used so far with cameras (such as video cameras, single-lens reflex cameras, and digital cameras), there has been an eyepiece optical system of the type known that is made up of three lenses: a positive lens, a negative lens and a positive lens in order from an object (display plane) side toward an exit (exit pupil) side, as disclosed in Patent Publications 1, 2 and 3.

The eyepiece optical system of the triplet type having such a positive-negative-positive refractive power profile works in favor of achieving higher performance, because they can easily be corrected for aberrations such as spherical aberrations, albeit comprising fewer lenses. Eyepiece optical systems of other types have also been known from Patent Publications 4 to 9.

Patent Publication 1: JP(A) 2007-264179
Patent Publication 2: JP(A) 2002-082290
Patent Publication 3: JP(A) 2004-258653
Patent Publication 4: JP(A) 2008-107380
Patent Publication 5: JP(A) 2008-203290
Patent Publication 6: JP(A) 2002-365562
Patent Publication 7: JP(A) 2007-225835
Patent Publication 8: JP(A) 2001-272610
Patent Publication 9: JP(A) 2002-048985

However, the eyepiece optical system of Patent Publication 1 is found to be insufficient in terms of optical performance; for instance, when the viewer s pupil is away from the optical axis, there is less insignificant distortion of the image being viewed.

The eyepiece optical systems of Patent Publications 2 and 3 are longer in terms of the whole focal length, working against achieving size reductions of the whole optical system including a display plane and making sure the angle of field.

In view of the foregoing problems, the first aspect of the invention has for its object the provision of an eyepiece optical system that albeit being of smaller size, works in favor of making sure the angle of field and optical performance, and an electronic view finder incorporating the same.

The second aspect of the invention has for its object the provision of an electronic view finder that includes a first lens group and a rear-side lens group on an exit side with respect to the first lens group and is of the type that focusing is implemented by moving the rear-side lens group, wherein there is an eyepiece optical system used that works in favor of offering a sensible tradeoff between size reductions and optical performance.

SUMMARY OF THE INVENTION

In order to accomplish the aforesaid objects, the eyepiece optical system and the electronic view finder of the invention are embodied as follows.

First of all, the first aspect of the invention is explained.

According to the first aspect of the invention, there is an eyepiece optical system provided that comprises, in order from an object side toward an exit side, a first lens group consisting of a single lens having positive refracting power and being in a meniscus form concave on its object side, a second lens group consisting of a single lens having negative refracting power and being in a meniscus form concave on its object side and a third lens group consisting of a single lens having positive refracting power, and is characterized in that an object-side concave lens surface in said first lens group is an aspheric surface, an object-side concave lens surface in said second lens group is an aspheric surface, and an exit-side lens surface in said third lens group is an aspheric surface.

Reference is now made to the requirements for, and the advantages of, the above arrangement of the first eyepiece optical system according to the invention.

Being made up of three lenses: in order from the object side, the single lens of positive refracting power, the single lens of negative refracting power and the single lens of positive refracting power, the eyepiece optical system of the invention works in favor of making the whole length shorter and making better correction for aberrations, albeit consisting of a reduced number of lenses. It follows that when the whole length is taken as the sum of the first spacing from the front focal position to the front principal point position (of the eyepiece optical system), the second spacing from the front principal point to the rear principal point and the third spacing from the rear principal point to the rear focal position, the second spacing has a negative sign: this arrangement works more in favor of making the whole length shorter as compared with an arrangement where the second spacing has the same sign.

Six refractive surfaces are used for correction of aberrations, and the lens of negative refracting power is located between the two positive lenses so that spherical aberrations and curvature of field can more easily be corrected. In addition, the eyepiece optical system of the invention allows the first lens group to have positive refracting power and be in a meniscus form concave on its object side so that the position of the fist lens group draws to the object side. A distance from an object (for instance, a display plane of a display device or a screen plane on which optical images are to be formed) to the first lens group becomes short, working more in favor of correction of distortion.

Further, the refracting power of the first lens group is so more easily reduced that correction of distortion can more advantageously be implemented. In addition, as the object-side concave surface in the first lens group is configured in an aspheric form, it works more in favor of correction of lower- or higher-order distortions, ending up with further reductions in the optical system size.

In addition, as the second lens group is configured in a meniscus form concave on its object side, it works in favor of making sure a sufficient angle of field and exit pupil size. This also works in favor of making sure the ability of the object-side concave surface to cancel out various aberrations. This concave surface tends to have a large absolute value for curvature; however, if that surface is constructed of an aspheric surface, it then works in favor of correction of higher-order aberrations. Specifically, coma, curvature of field and astigmatism can more advantageously be corrected.

If the exit-side lens surface in the third lens group is constructed of an aspheric surface, it then works more in favor of correction of spherical aberrations, and distortion occurring when the viewer s pupil is away from the optical axis.

Thus, if the eyepiece optical system according to the first arrangement of the invention is adopted, it is then possible to implement better correction of various aberrations even where the angle of field and exit pupil are ensured with reductions in the whole length of the optical system. In addition, even when the position of the viewer s pupil is off the optical axis, it is possible to achieve better viewing of images.

More preferably, the first arrangement of this eyepiece optical system should be satisfied along with any of the second to sixth arrangements described below.

According to the second arrangement of the invention, the first arrangement is further characterized in that for diopter adjustment, the second lens group and the third lens group move in unison along the optical axis.

Reference is now made to the requirements for, and the advantages of, the above second arrangement of the eyepiece optical system according to the invention.

As the second and the third lens group move in unison for diopter adjustment, it allows aberrational fluctuations to be much reduced than could be achieved by movement of the single lens group alone, because aberrations are canceled out at the second and the third lens group.

This arrangement also works more in favor of making sure of a space for movement as compared when diopter is adjusted by movement of the whole eyepiece optical system.

Further, this arrangement facilitates sealing up between the display plane and the first lens group, preventing entrance of dusts in the vicinity of the display plane.

According to the third arrangement of the invention, the first eyepiece optical system is further characterized in that said first lens group is in a meniscus form capable of satisfying the following condition (1).

$$1.01 \leq (R11+R12)/(R11-R12) \leq 20.0 \quad (1)$$

where R11 is the radius of curvature of the object-side lens surface in said first lens group, and R12 is the radius of curvature of the exit-side lens surface in said first lens group.

Reference is now made to the requirements for, and the advantages of, the third arrangement of the eyepiece optical system according to the invention.

Condition (1) defines a more preferable configuration of the first lens group. By setting the lower limit to condition (1) at not less than 1.01, the negative refracting power of the concave surface in the first lens group is so ensured that the positive refracting power of the first lens group can properly be reduced, working in favor of correction of distortion. By setting the upper limit to condition (1) at not greater than 20.0, the positive refracting power of the first lens group is so ensured that the separation between the first and the second lens group can be kept narrower, working in favor of size reductions.

More preferably, condition (1) should have a lower limit of 1.1, specifically 1.9 and an upper limit of 10.0, more specifically 7.0, 5.0, 4.7 or 4.0, most specifically 3.4.

According to the fourth arrangement of the invention, the first eyepiece optical system is further characterized in that the second lens group is in a meniscus form capable of satisfying the following condition (2).

$$-4.0 \leq (R21+R22)/(R21-R22) \leq -1.01 \quad (2)$$

where R21 is the radius of curvature of the object-side lens surface in said second lens group, and R22 is the radius of curvature of the exit-side lens surface in said second lens group.

Reference is now made to the requirements for, and the advantages of, the fourth arrangement of the eyepiece optical system according to the invention.

Condition (2) defines a more preferable configuration of the second lens group. As the lower limit to this condition is set at not less than −4.0 it facilitates making sure the second lens group has negative refracting power, thereby enabling the optical system to have well-balanced power and working in favor of correction of various aberrations.

As the upper limit to condition (2) is set at not greater than −1.01, it is easy to stay the exit pupil away from the optical system without decreasing the positive refracting power of the first lens group. In addition, this works in favor of correction of spherical aberrations at the object-side lens surface in the second lens group, etc.

Simultaneous satisfaction of conditions (1) and (2) works more in favor of total length reductions and correction of aberrations.

More preferably, condition (2) should have a lower limit of −3.0, specifically −2.3.

More preferably, condition (2) should have an upper limit of −1.1, specifically −1.3.

According to the fifth arrangement of the invention, the eyepiece optical system of the invention is further characterized in that said first lens group, said second lens group and said third lens group satisfy the following conditions (3), (4) and (5).

$$1 \leq F1/F \leq 4 \quad (3)$$

$$-1.4 \leq F2/F \leq -0.4 \quad (4)$$

$$0.3 \leq F3/F1 \quad (5)$$

where F1 is the focal length of said first lens group,

F2 is the focal length of said second lens group,

F3 is the focal length of said third lens group, and

F is the focal length of the whole eyepiece optical system provided that when said eyepiece optical system can be adjusted for diopter by movement of any of the lens groups in the optical system, F is the focal length of the whole eyepiece optical system at −1 diopter.

Reference is now made to the requirements for, and the advantages of, the fifth arrangement of the eyepiece optical system according to the invention.

Condition (3) defines a preferable one for the quantity (F1/F) indicative of the focal length (F1) of the first lens group with respect the focal length (F) of the whole eyepiece optical system.

Condition (4) defines a preferable one for the quantity (F2/F) indicative of the focal length (F2) of the second lens group with respect the focal length (F) of the whole eyepiece optical system.

Condition (5) defines a preferable one for the quantity (F3/F) indicative of the focal length (F3) of the third lens group with respect the focal length (F) of the whole eyepiece optical system.

Satisfaction of conditions (3), (4) and (5) makes it possible to allocate proper refracting powers to the respective lens groups, working more in favor of offering a sensible tradeoff between correction of various aberrations and total length reductions.

As the lower limit to condition (3) is set at not less than 1, it makes sure the refracting power of the first lens group remains reduced, working in favor of correction of distortion.

As the upper limit to condition (3) is set at not greater than 4, it makes sure the first lens has refracting power, narrowing the space between the first and the second lens group and working in favor of compactness.

As the lower limit to condition (4) is set at not less than −1.4, it makes sure the second lens group has negative refracting power, working in favor of correction of spherical aberrations, astigmatism, coma, and curvature of field. It also enables the principal point space of the whole eyepiece optical system to remain narrow, working in favor of compactness.

As the upper limit to condition (4) is set at not greater than −0.4, it keeps the negative refracting power of the second lens group down at a proper level, working in favor of correction of higher-order spherical aberrations, astigmatism, coma, and curvature of field.

As the lower limit to condition (5) is set at not less than 0.3, it keeps the refracting power of the third lens group down at a proper level, working in favor of correction of spherical aberrations, astigmatism, coma, and curvature of field.

As the upper limit to condition (5) is set at not greater than 1, it makes sure the third lens group has refracting power and all the lens groups have refracting power, working in favor of compactness.

More preferably, condition (3) should have a lower limit of 1.2, specifically 1.4.

More preferably, condition (3) should have an upper limit of 3.7, specifically 3.5.

More preferably, condition (4) should have a lower limit of −1.2, specifically −1.1.

More preferably, condition (4) should have an upper limit of −0.5, specifically −0.7.

More preferably, condition (5) should have a lower limit of 0.4, specifically 0.5.

More preferably, condition (5) should have an upper limit of 0.85, specifically 0.80.

According to the sixth arrangement of the invention, the eyepiece optical system of the invention is further characterized in that said third lens group is a single lens in a double-convex configuration capable of satisfying the following condition (7).

$$0.1 \leq (R31+R32)/(R31-R32) 50.9 \tag{7}$$

where R31 is the radius of curvature of the object-side lens surface in said third lens group, and R32 is the radius of curvature of the exit-side lens surface in said third lens group.

Reference is now made to the requirements for, and the advantages of, the sixth arrangement of the eyepiece optical system according to the invention.

Condition (7) defines a more preferable configuration of the third lens group. As the lower limit to condition (7) is set at not less than 0.1, it makes sure the object-side lens surface in the third lens group has positive refracting power, working in favor of correction of spherical aberrations, etc.

As the upper limit to condition (7) is set at not greater than 0.9, it helps keep the object-side convex surface in the third lens group down to a proper level, working in favor of correction of off-axis aberrations.

More preferably, condition (7) should have a lower limit of 0.2, specifically 0.3.

More preferably, condition (7) should have an upper limit of 0.8, specifically 0.7.

The first arrangement of the inventive electronic view finder comprises an image display device including a display plane for showing images, and an eyepiece optical system located on an image display side of said image display device and adapted to enlarge an image displayed on said display plane, characterized in that said eyepiece optical system is any one of said first to sixth eyepiece optical systems.

The aforesaid eyepiece optical systems are each improved in terms of total length reductions and performance. If an object is configured in the form of the display plane of the image display device, it is then possible to achieve an electronic view finder of smaller size and higher performance.

More preferably, the first arrangement of this electronic view finder plus either one of the second and the third arrangement described below should be satisfied at the same time.

According to the second arrangement of the inventive electronic view finder, the electronic view finder is further characterized by satisfying the following condition (6).

$$F1/D1 \geq 4.0 \tag{6}$$

Where F1 is the focal length of said first lens group, and

D1 is the distance on the optical axis from said first lens group to said display plane.

Reference is now made to the requirements for, and the advantages of, the second arrangement of the inventive electronic view finder.

Condition (6) defines a preferable position at which the first lens group is located. Satisfaction of this conditions works in favor of total length reductions, sufficient finder magnifications, and higher eye point. In addition, it works in favor of correction of distortion.

Preferably, condition (6) should have a lower limit of 6.0, specifically 7.0.

It is also preferable for condition (6) to have an upper limit of 50. As the upper limit is thus set at not greater than 50, it allows the first lens group to be stayed away from the display plane so that dusts and flaws, if any, on the first lens group are little visible.

More preferably, condition (6) should an upper limit of 40, specifically 30.

The third arrangement of the inventive electronic view finder is characterized by satisfying the following condition (8).

$$-2.0 \leq D12/F12 \leq -0.05 \tag{8}$$

where F2 is the focal length of said second lens group, and

D12 is the distance on the optical axis from said first lens group to said second lens group; however, when said eyepiece optical system can be adjusted for diopter by movement of either one of the lens groups, D12 is a distance at −1 diopter.

Reference is now made to the requirements for, and the advantages of, the third arrangement of the electronic view finder according to the invention.

Condition (8) defines a preferable distance on the optical axis between the first and the second lens group.

Satisfaction of this condition works more in favor of a sensible tradeoff between correction of off-axis aberrations and size reductions of the optical system.

As the lower limit is set at not less than −2.0, it enables the distance between the first and the second lens group to be shortened, working in favor of size reductions.

As the upper limit to condition (8) is set at not greater than −0.05, it makes sure the first lens group has a distance from the second lens group so that it is easy to draw the exit-side lens surface in the first lens group to the display plane, working in favor of correction of off-axis aberrations.

More preferably, condition (8) should have a lower limit of −1.5, specifically −1.0.

More preferably, condition (8) should have an upper limit of −0.1, specifically −0.23, more specifically −0.35.

The second aspect of the invention is now explained.

According to the second aspect of the invention, there is an electronic view finder provided, which comprises:

an image display device having a display plane adapted to display an image, and an eyepiece optical system located on a display plane side of said image display device and adapted to enlarge an image displayed on said display plane, wherein said eyepiece optical system comprises, in order from an object side on which said display plane is located toward an exit side, a first lens group having a curved refractive surface, and a rear lens group having positive refracting power, wherein during diopter adjustment, said first lens group remains fixed and said rear lens group moves along an optical axis of said eyepiece optical system, and there is no lens group provided other than said first lens group and said rear lens group, with satisfaction of the following conditions (A) and (B):

$$|F/F1| \leq 0.667 \qquad (A)$$

$$8 \leq |F1/D1_{air}| \leq 16 \qquad (B)$$

where F is the focal length at −1 diopter of the whole eyepiece optical system,

F1 is the focal length of said first lens group, and $D1_{air}$ is the distance, as calculated on an air basis, on the optical axis from said first lens group to said display plane.

Condition (A) defines a proper range of the quantity (F/F1) indicative of the magnitude of the power (1/F1) of the first lens group with respect to the power (1/F) of the whole optical system.

As this condition is satisfied so that the power profile of each lens group is properly determined, it works in favor of a sensible tradeoff between correction of various aberrations and total length reductions.

In other words, as the upper limit to condition (A) is set at not greater than 0.667, it allows the absolute value of the power of the first lens group to be properly limited, working in favor of correction of various aberrations at the first lens group with no need of increasing the number of lenses in the first lens group.

Condition (B) defines a proper position at which the first lens group is located.

As the lower limit to condition (B) is set at not less than 8, it enables the absolute value of the power of the first lens group to be properly limited so that both the thicknesses of the first lens group near its center and its periphery can be reduced, leading to compactness.

As the upper limit to condition (B) is set at not greater than 16, it permits the first lens group to be properly stayed away from the display plane so that images of good quality are easily obtainable because dusts, if any, on the first lens group are little visible.

Further, it is preferable for the first lens group to have negative refracting power. In that case, too, it is preferable to satisfy these conditions, because of ease with which finder magnifications are increased and total length is made short. This also works in favor of correction of distortion, etc.

Preferably, said rear lens group includes a plurality of positive lenses and at least one negative lens, wherein said at least one negative lens is interposed between the plurality of said positive lenses.

Thus, as a plurality of positive lenses and the negative lens are located in the rear lens group and the positive lenses are located on both sides of that negative lens, it permits the signs of the refracting powers of the respective lenses in the rear lens group to draw to a symmetrical layout, working in favor of correction of various aberrations.

Preferably, the aforesaid rear lens group should comprise a plurality of positive lenses and a negative meniscus lens that is interposed between them and in a meniscus configuration concave on its object side.

Thus, as the negative lens interposed between a plurality of positive lenses in the rear lens group is configured in a meniscus form concave on its object side, it works in favor of making sure sufficient angles of field, and exit pupil size. It also works in favor of gaining the function to cancel out various aberrations at the object-side concave surface.

Preferably, the aforesaid first lens group should be a single lens that has negative refracting power and is concave on its exit side.

Thus, as the first lens group is made up of a single lens that has negative refracting power and is in a meniscus configuration concave on its exit side, it works in favor of weight reductions.

Preferably, the aforesaid negative lens in the aforesaid first lens group should have an absolute value of the curvature of its object-side surface smaller than that of its exit-side surface.

Thus, as the negative lens in the first lens group is designed to have an absolute value of the curvature of its object-side surface smaller than that of its exit-side surface, it works in favor of correction of aberrations.

As the surface nearest to the object side in the aforesaid first lens group is configured in a planar form, it works in favor of cost reductions.

Preferably, the sum of lenses in the aforesaid first lens group and the aforesaid rear lens group should be 2 to 4 inclusive. Such an arrangement works in favor of size reductions.

Preferably, the exit-side surfaces of all lenses included in the aforesaid rear lens group should be convex on their exit sides.

Preferably, the sum of lenses included in the aforesaid rear lens group should be 3 in view of a sensible tradeoff between performance and size reductions.

Preferably, a powerless cover glass should be located on the exit side of the aforesaid rear lens group, because dusts are unlikely to enter the eyepiece optical system.

Preferably, the range wherein diopter is adjustable by movement of the aforesaid rear lens group should be greater than 6.2 diopters and less than 20 diopters inclusive.

As the lower limit is set at not less than 6.2 diopters, it is compatible with those with hypermetropia and myopias, and as the upper limit is set at not greater than 20 diopters, it is possible to narrow down the range of movement of the rear lens group.

More preferably, the lower limit should be greater than 7.5 diopters and/or the upper limit should be less than 12.

According to the first aspect of the invention, there can be an eyepiece optical system provided that, albeit being of smaller size, works in favor of gaining the angle of field and optical performance. Further, there can be an electronic view finder provided that incorporates such an eyepiece optical system.

According to the second aspect of the invention, there can be an electronic view finder provided, which comprises an eyepiece optical system that comprises a first lens group and a rear lens group located on an exit side with respect to the first lens group and is of the type that focusing is implemented by movement of the rear lens group, wherein said eyepiece optical system works in favor of offering a sensible tradeoff between size reductions and performance.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The eyepiece optical systems and electronic view finders according to the first aspect of the invention are now explained with reference to FIGS. 1 to 12. FIGS. 1 to 6 are illustrative of the electronic view finders of Examples 1 to 6, respectively. In the respective figures, (a), (b), and (c) are illustrative of states at −1 diopter, +1 diopter, and −3 diopters, respectively. FIGS. 7 to 12 are aberrational diagrams for the eyepiece optical systems of Examples 1 to 6, respectively.

Figure 1:
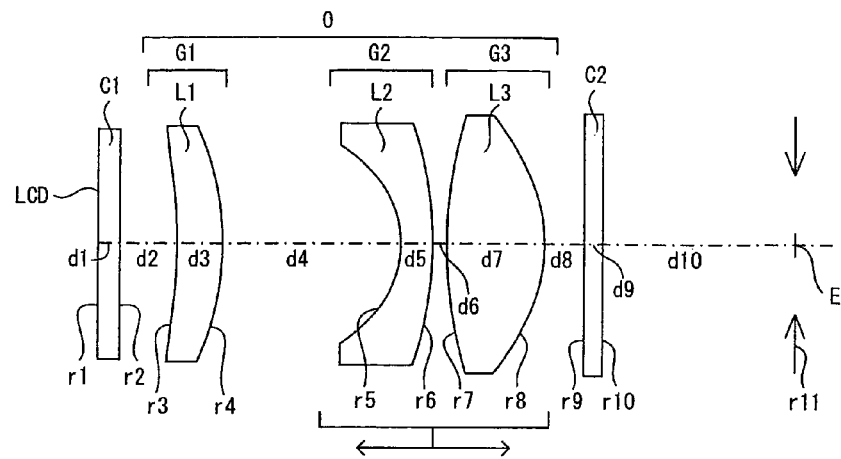
FIG. 1 is an exploded sectional view of the eyepiece optical system of Example 1 according to the invention as taken along an optical axis.
Figure 1:
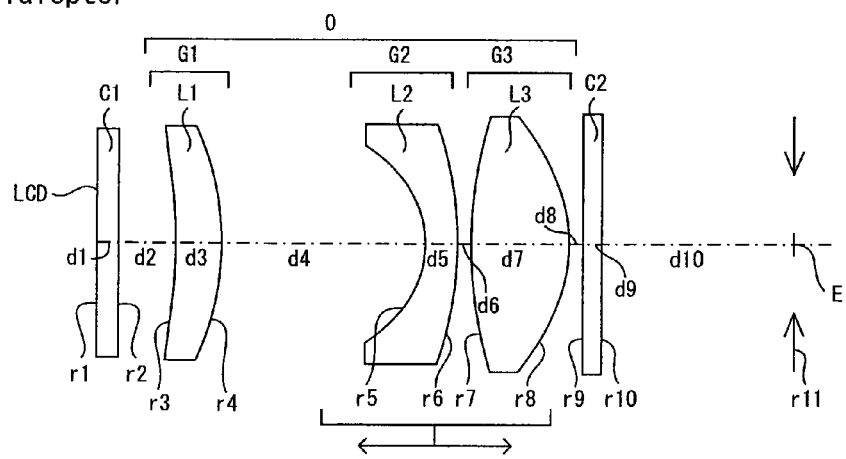
Figure 1:
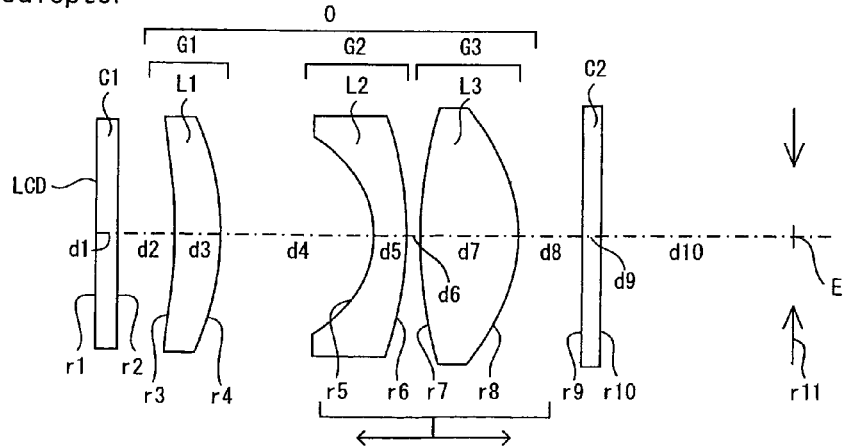
Figure 2:
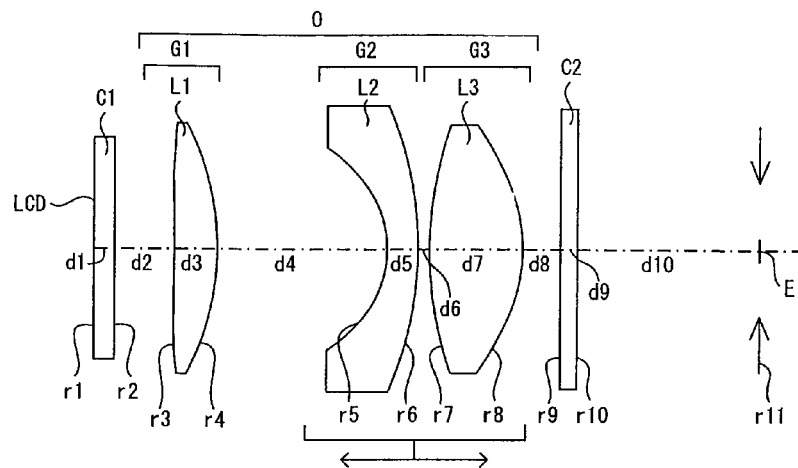
FIG. 2 is an exploded sectional view of the eyepiece optical system of Example 2 according to the invention as taken along an optical axis.
Figure 2:
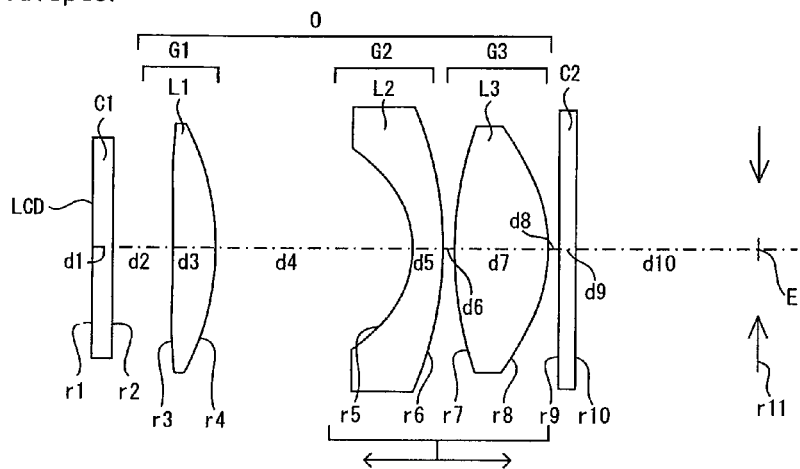
Figure 2:
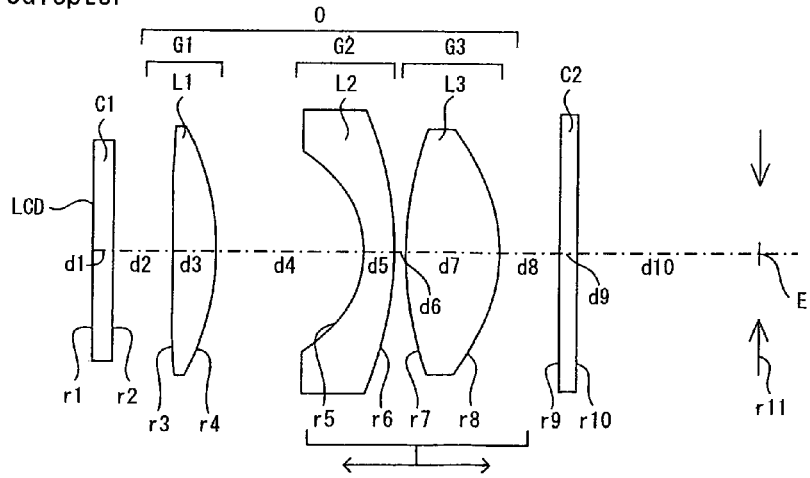
Figure 3:
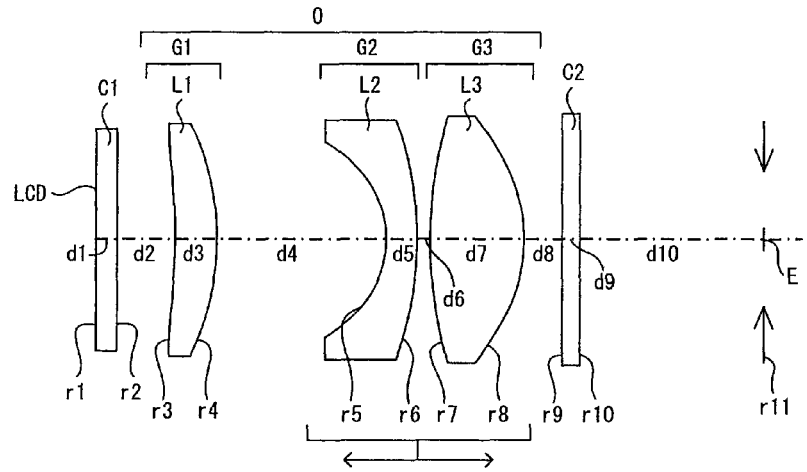
FIG. 3 is an exploded sectional view of the eyepiece optical system of Example 3 according to the invention as taken along an optical axis.
Figure 3:
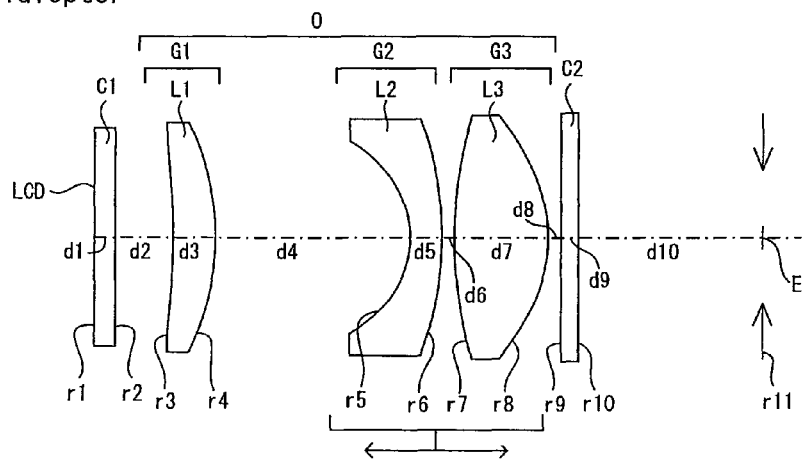
Figure 3:
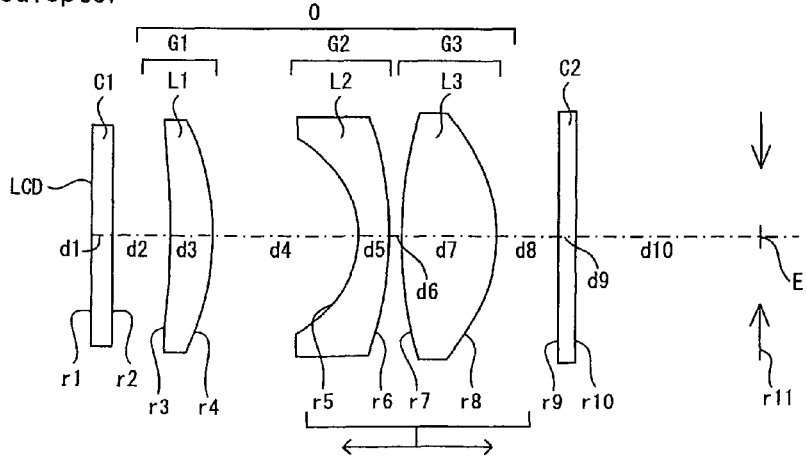
Figure 4:
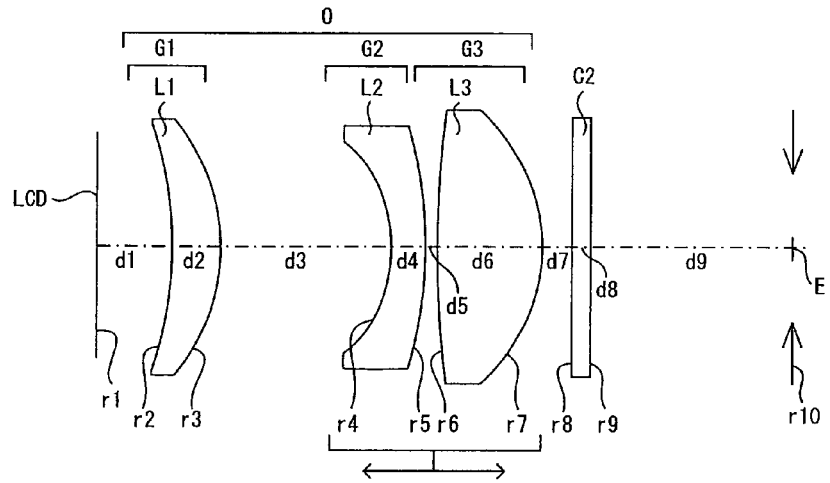
FIG. 4 is an exploded sectional view of the eyepiece optical system of Example 4 according to the invention as taken along an optical axis.
Figure 4:
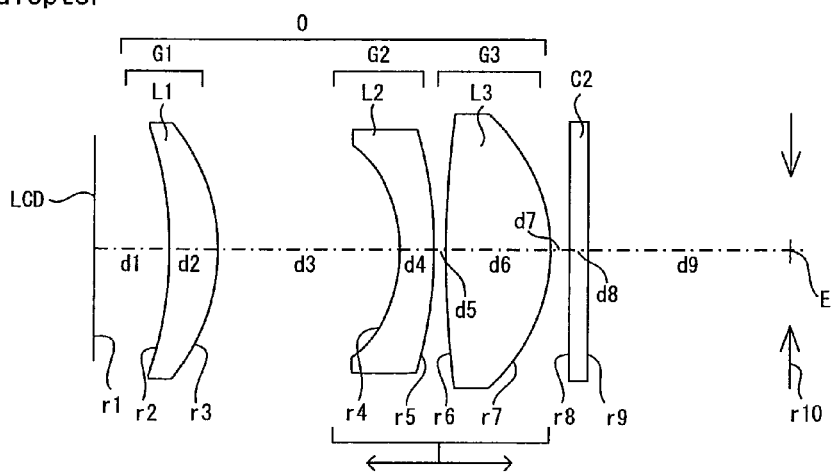
Figure 4:
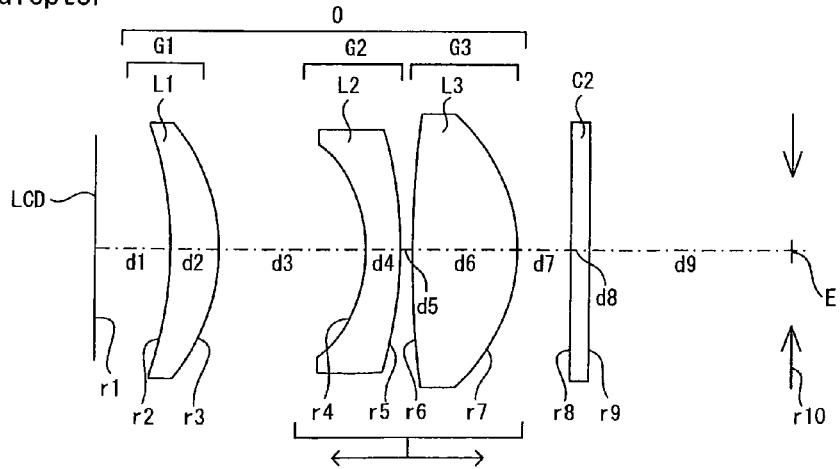
Figure 5:
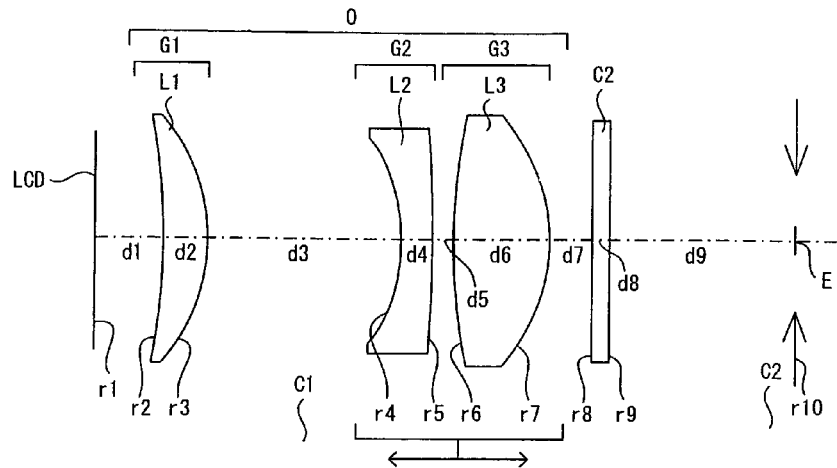
FIG. 5 is an exploded sectional view of the eyepiece optical system of Example 5 according to the invention as taken along an optical axis.
Figure 5:
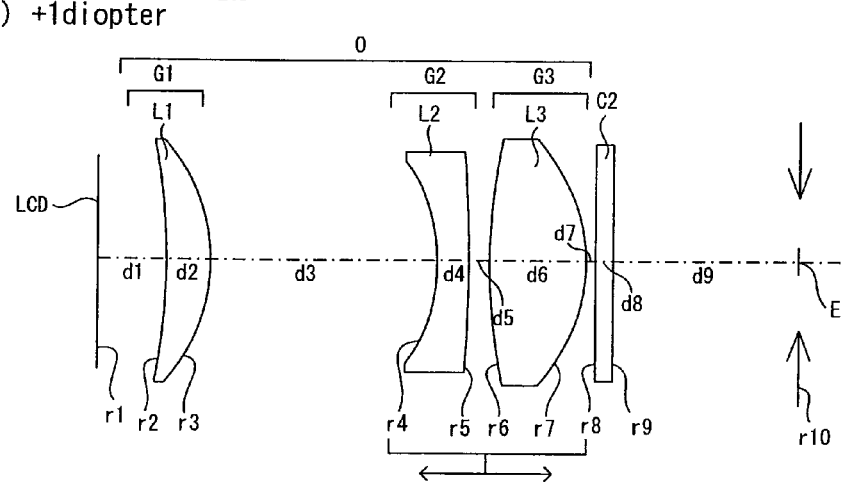
Figure 5:
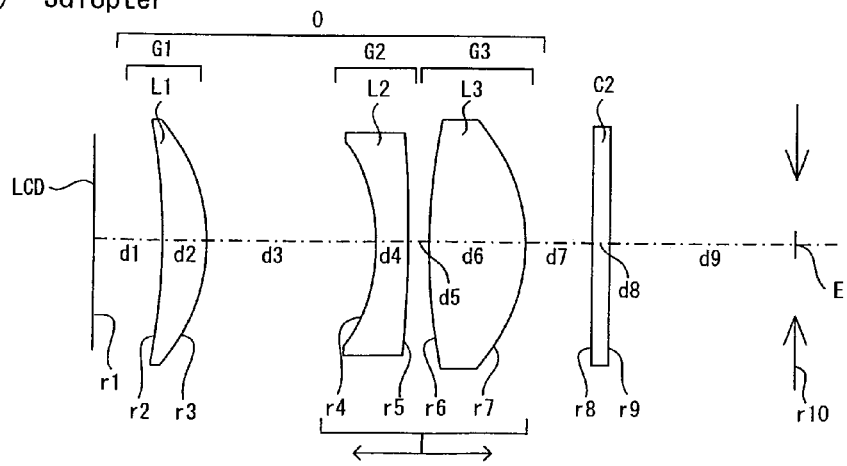
Figure 6:
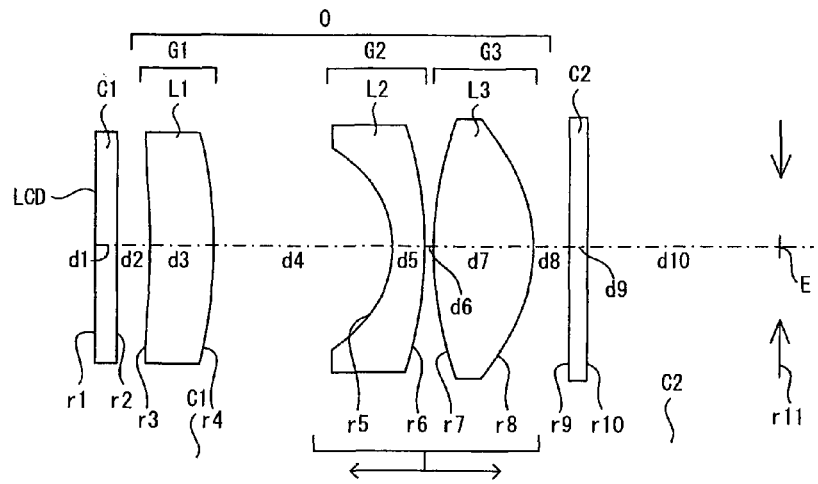
FIG. 6 is an exploded sectional view of the eyepiece optical system of Example 6 according to the invention as taken along an optical axis.
Figure 6:
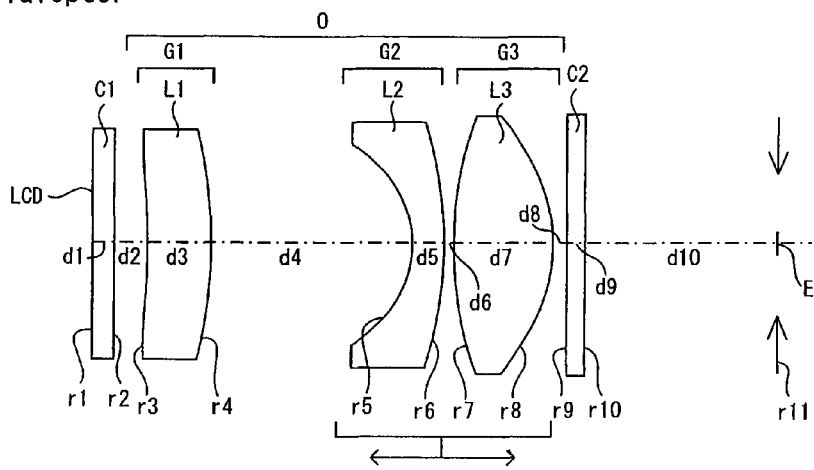
Figure 6:
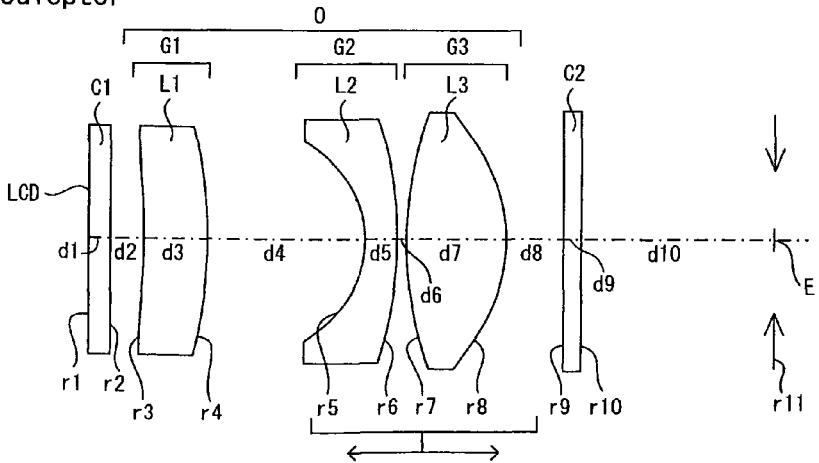
Figure 7:
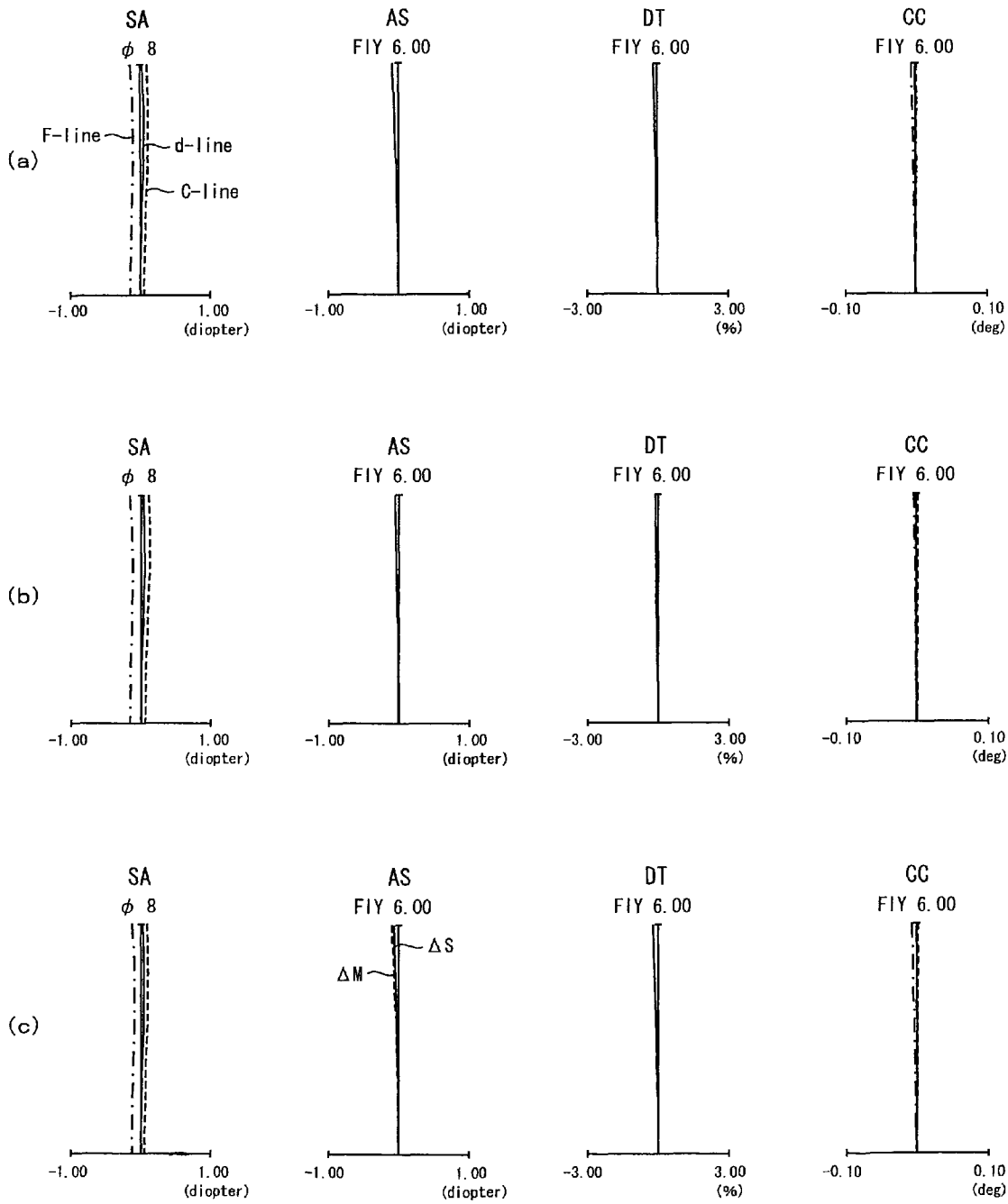
FIG. 7 is an aberrational diagram for the eyepiece optical system of Example 1 according to the invention.
Figure 8:
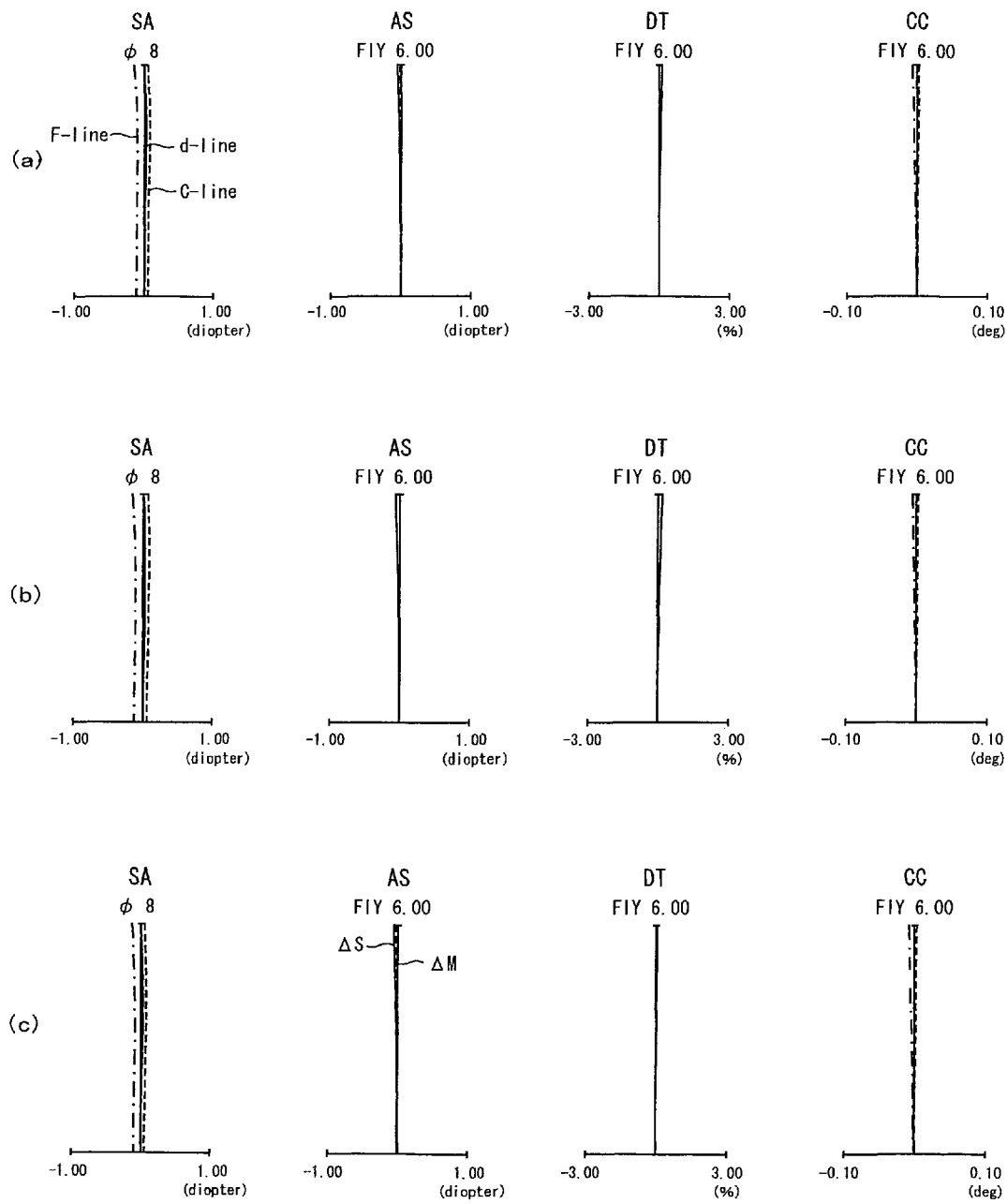
FIG. 8 is an aberrational diagram for the eyepiece optical system of Example 2 according to the invention.
Figure 9:
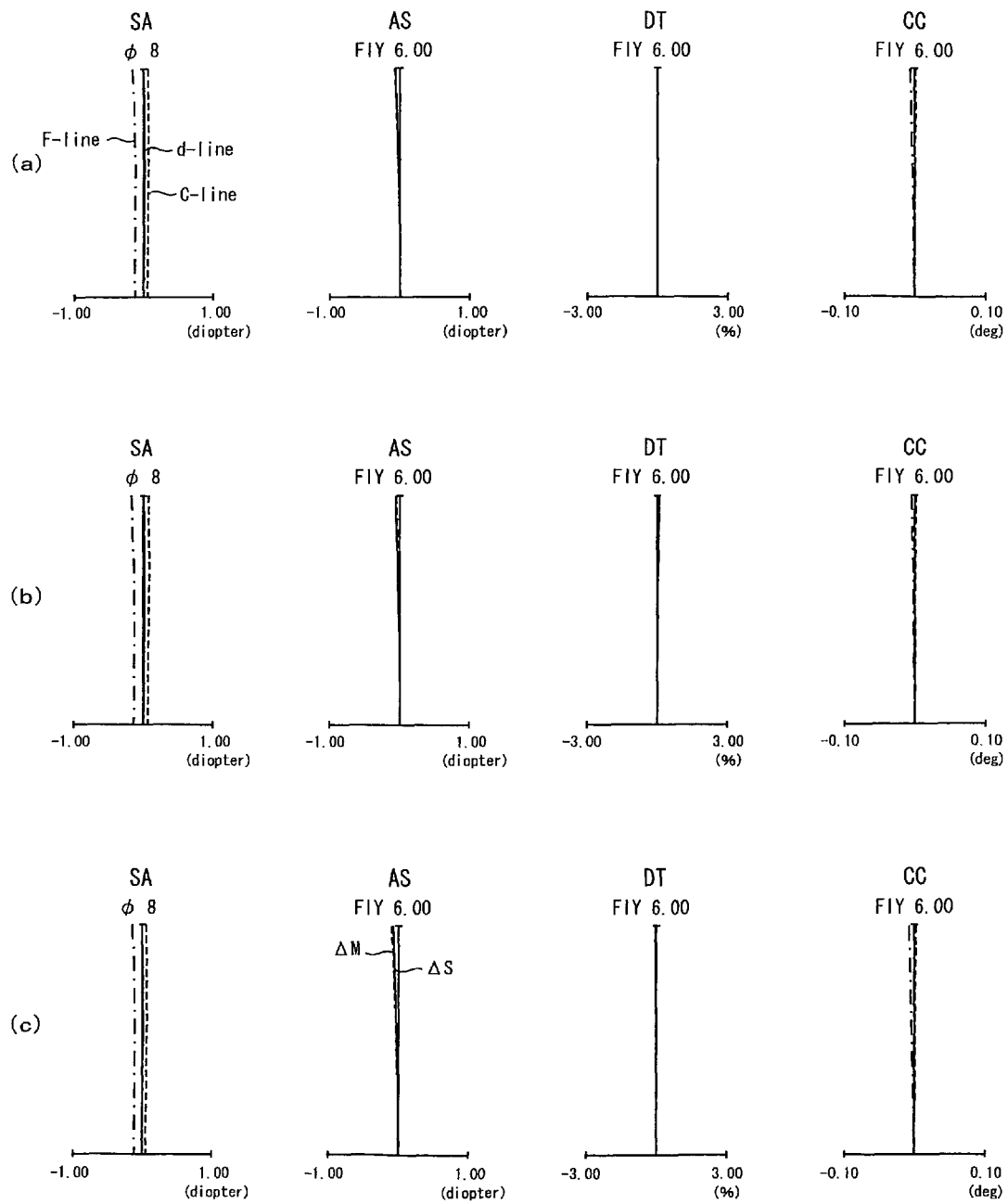
FIG. 9 is an aberrational diagram for the eyepiece optical system of Example 3 according to the invention.
Figure 10:
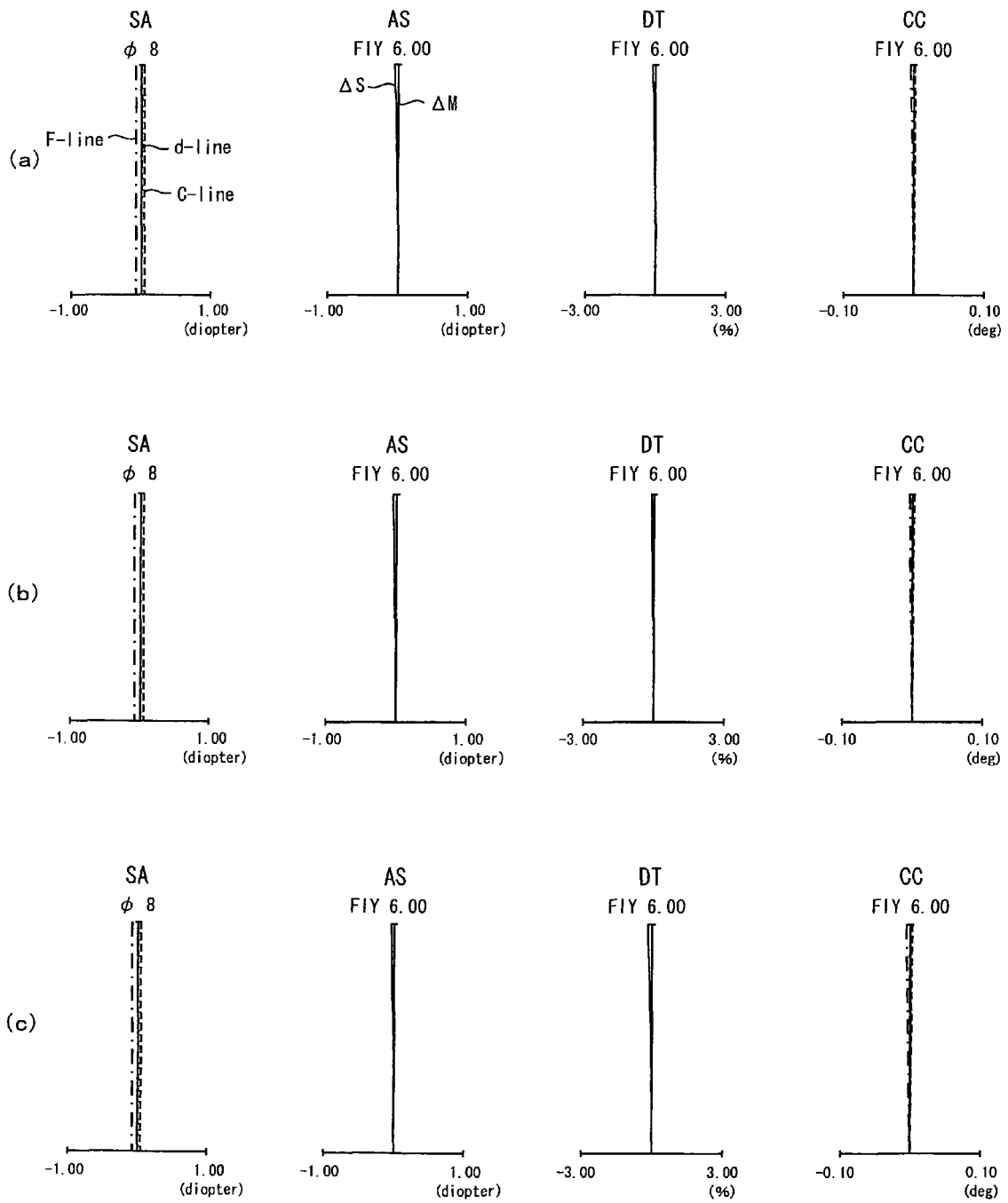
FIG. 10 is an aberrational diagram for the eyepiece optical system of Example 4 according to the invention.
Figure 11:
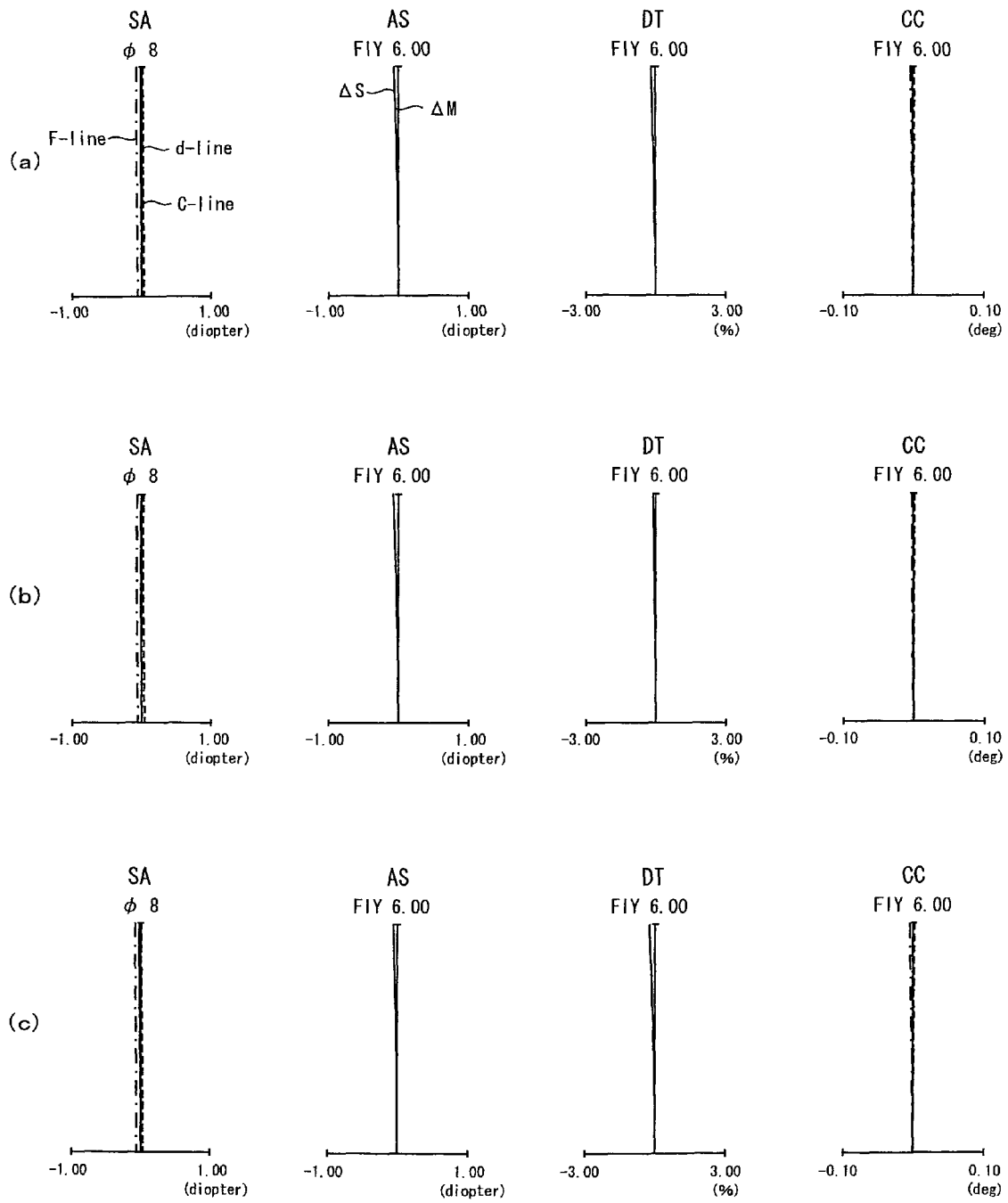
FIG. 11 is an aberrational diagram for the eyepiece optical system of Example 5 according to the invention.
Figure 12:
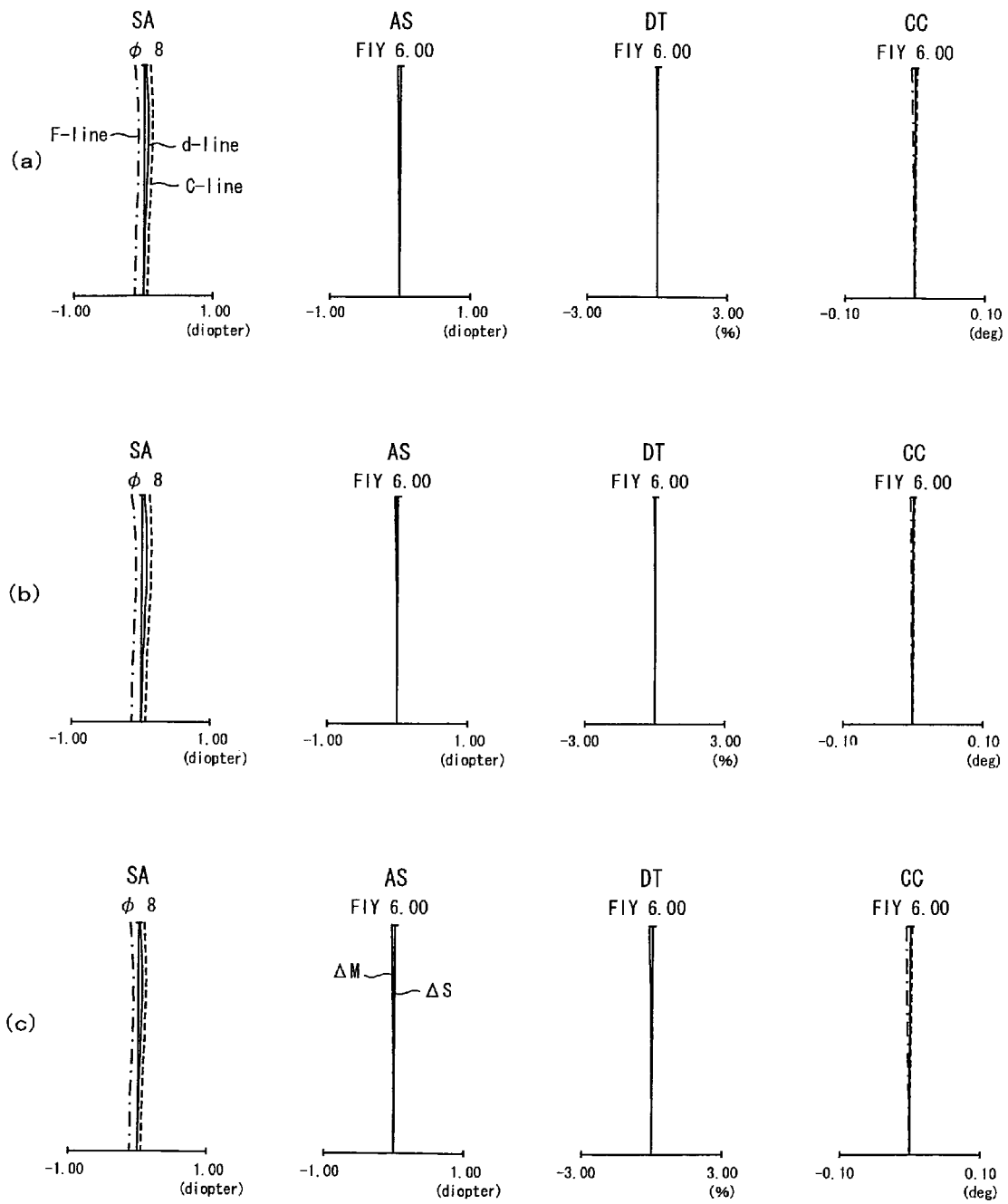
FIG. 12 is an aberrational diagram for the eyepiece optical system of Example 6 according to the invention.

FIG. 1 is an exploded sectional view of the eyepiece optical system of Example 1 according to the invention as taken along the optical axis.

The electronic view finder of Example 1 comprises a liquid crystal display device LCD adapted to display an object image, and an eyepiece optical system O. In FIG. 1, E is indicative of an eye point (virtual stop).

A display screen size of the liquid crystal display device LCD is supposed to be 9.6 mm in short side and 7.2 mm in long side, and the eyepiece optical system O is designed to incorporate a display plane having a maximum height of 6 mm.

The eyepiece optical system O is made up of, in order from the display plane (object side) on which the liquid crystal display device LCD is installed toward a viewing side (exit side), a first lens group G1, a second lens group G2, and a third lens group G3.

The first lens group G1 is made up of a single lens L1 that has positive refracting power and is in a positive meniscus configuration concave on its object side.

The second lens group G2 is made up of a single lens L2 that has negative refracting power and is in a negative meniscus configuration concave on its object side.

The third lens group G3 is made up of a single lens L3 that has positive refracting power and is in a double-convex configuration.

Plastic aspheric lenses are used for the lenses L1, L2 and L3 that form the first, second and third lens groups G1, G2 and G3. The plastic lenses work in favor of mass-fabrication and cost reductions, because the single lenses can be fabricated by means of injection molding.

In Example 1, design is implemented while taking into consideration a cover glass C1 provided on the display plane of the liquid crystal display device LCD. On the other hand, the eyepiece optical system O is provided on its exit side with an exit window member C2 to prevent entrance of dusts into the optical system.

Diopter is adjusted by moving the second lens group G2 (lens L2) and the third lens group G3 (lens L3) in unison in the optical axis direction. These lens groups G2 and G3 are moved toward the exit side so as to increase diopters and toward the object side so as to decrease diopters.

FIGS. 2 to 6 are exploded sectional views of the eyepiece optical systems of Examples 2 to 6, respectively, as taken along the optical axis. These eyepiece optical systems are constructed as in Example 1. Note here that, in Examples 4 and 5, design is implemented while taking no care of the cover glass C1 provided on the display plane of the liquid crystal display device LCD.

Set out below are various numerical data (surface data, aspheric data, variable spacing data, various data 1, and various data 2) on the aforesaid Examples 1 to 6.

Surface data include for each surface number the radius of curvature r of the lens surface, the section d (surface-to-surface spacing) of the lens, the d-line (587.6 nm) refractive index nd of the lens (optical medium) and the d-line Abbe constant vd of the lens (optical medium). The radius of curvature r and section (surface-to-surface spacing) d are given in mm. In the surface data, asterisk * affixed to the right side of the surface number indicates that the lens surface is in an aspheric configuration, and INF affixed to the radius of curvature is indicative of infinity.

Aspheric data include data on aspheric lens surfaces. Let x be indicative of the optical axis provided that the direction of travel of light is taken as positive, and y be indicative of a direction orthogonal to the optical axis. Then, aspheric configuration is given by:

$$x = (y^2/r)/[1+\{1-(K+1)(y/r)^2\}^{1/2}] + A4y^4 + A6y^6 + A8y^8 + \ldots$$

where r is the paraxial radius of curvature, K is the conic coefficient, and A4, A6 and A8 are the fourth-, the sixth-, and the eighth-order aspheric coefficients, respectively. Note here that the capital E is a power exponent with the subsequent figure having 10 as base. For instance, 1.0E-5 means $1.0 \times 10^{-5}$.

Variable spacing data include lens section (surface-to-surface spacing) d that change upon diopter adjustment by movement of the second lens group G2, and the third lens group G3, and are given by figures at −1 diopter, +1 diopter, and −3 diopter. As in the section (surface-to-surface spacing) d, unit is given in mm.

Various data 1 include the angle of field of the eyepiece optical system O that changes upon diopter adjustment by movement of the second lens group G2, and the third lens group G3, and the focal length of the whole eyepiece optical system at −1 diopter. The angle of field is expressed in terms of angle (deg) by the frequency method, and the focal length is given in mm.

Various data 2 include the focal length F1 of the first lens group G1, the focal length F2 of the second lens group G2, the focal length F3 of the third lens group G3, total length, pupil diameter, and the maximum height of the display plane, each given in mm. Note here that the total length is the distance from the display plane of the liquid crystal display device LCD to the exit-side surface of the exit window member C2.

Numerical Example 1
Unit mm

Surface data

| Surface Number | r | d | nd | vd |
|---|---|---|---|---|
| 1 (Display plane) | INF | 1.2 | 1.51633 | 64.14 |
| 2 | INF | 3.2188 | | |
| 3* | −25.2482 | 2.5 | 1.52542 | 55.78 |
| 4 | −16.7195 | D1 (Variable) | | |
| 5* | −5.8301 | 1.8 | 1.58423 | 30.49 |
| 6 | −21.052 | 0.767 | | |
| 7* | 20.0277 | 5.5 | 1.52542 | 55.78 |
| 8* | −9.1323 | D2 (Variable) | | |
| 9 | INF | 1 | 1.51633 | 64.14 |
| 10 | INF | 10.63 | | |
| 11 (Virtual stop) | INF | | | |

Aspheric data

3$^{rd}$ surface

K = −11.1683
A4 = 4.9071E−05
A6 = 1.8056E−06
A8 = −1.9065E−08

5$^{th}$ surface

K = −0.5995
A4 = −1.5483E−04
A6 = −5.2824E−06
A8 = −1.3779E−08

7$^{th}$ surface

K = −8.6058
A4 = −2.8539E−05
A6 = 3.9365E−07
A8 = 4.4520E−10

8$^{th}$ surface

K = −1.8699
A4 = −1.2667E−04
A6 = 2.3649E−07
A8 = 5.2496E−09

-continued

Numerical Example 1
Unit mm

Variable spacing data

| Diopter | −1 | +1 | −3 |
|---|---|---|---|
| D1 | 9.8474 | 11.36153 | 8.47821 |
| D2 | 2.2281 | 0.7139 | 3.59722 |

Various data 1

| Diopter | −1 | +1 | −3 |
|---|---|---|---|
| Angle of field | 22.509773 | 23.412179 | 21.494994 |
| Focal length | 24.521073 | 24.174984 | 24.915539 |

Various data 2

| | |
|---|---|
| F1 | 85.564 |
| F2 | −14.430 |
| F3 | 12.767 |
| Total length | 28.060 |
| Pupil diameter | 8 |
| Maximum height of the display plane | 6 |

Numerical Example 2
Unit mm

Surface data

| Surface Number | r | d | nd | vd |
|---|---|---|---|---|
| 1 (Display plane) | INF | 1.2 | 1.51633 | 64.14 |
| 2 | INF | 3.5017 | | |
| 3* | −129.8935 | 2.5 | 1.52542 | 55.78 |
| 4 | −16.264 | D1 (Variable) | | |
| 5* | −6.18 | 1.8 | 1.58423 | 30.49 |
| 6 | −22.0341 | 0.7487 | | |
| 7* | 19.5376 | 5.5 | 1.52542 | 55.78 |
| 8* | −9.5782 | D2 (Variable) | | |
| 9 | INF | 1 | 1.51633 | 64.14 |
| 10 | INF | 10.63 | | |
| 11 (Virtual stop) | INF | | | |

Aspheric data

3$^{rd}$ surface

K = 9.9996
A4 = 4.4882E−05
A6 = 2.8178E−06
A8 = −2.6438E−08

5$^{th}$ surface

K = −0.6485
A4 = −1.5451E−04
A6 = −4.7570E−06
A8 = 6.2857E−08

7$^{th}$ surface

K = −5.5198
A4 = −2.8801E−05
A6 = 4.1170E−07
A8 = 3.0472E−09

8$^{th}$ surface

K = −1.9696
A4 = −1.0080E−04
A6 = 5.0472E−07
A8 = 3.0472E−09

-continued

Numerical Example 2
Unit mm

Variable spacing data

| Diopter | −1 | +1 | −3 |
|---|---|---|---|
| D1 | 9.88322 | 11.44209 | 8.46049 |
| D2 | 2.20183 | 0.64295 | 3.62455 |

Various data 1

| Diopter | −1 | +1 | −3 |
|---|---|---|---|
| Angle of field | 24.004574 | 24.951549 | 22.942208 |
| Focal length | 22.631051 | 21.91174 | 23.475443 |

Various data 2

| | |
|---|---|
| F1 | 35.119 |
| F2 | −15.344 |
| F3 | 13.084 |
| Total length | 28.270 |
| Pupil diameter | 8 |
| Maximum height of the display plane | 6 |

Numerical Example 3
Unit mm

Surface data

| Surface Number | r | d | nd | vd |
|---|---|---|---|---|
| 1 (Display plane) | INF | 1.2 | 1.51633 | 64.14 |
| 2 | INF | 3.3791 | | |
| 3* | −35 | 2.5 | 1.52542 | 55.78 |
| 4 | −15.7217 | D1 (Variable) | | |
| 5* | −5.8874 | 1.8 | 1.58423 | 30.49 |
| 6 | −21.3166 | 0.7158 | | |
| 7* | 20.6781 | 5.5 | 1.52542 | 55.78 |
| 8* | −9.1179 | D2 (Variable) | | |

Numerical Example 3
Unit mm

| | | | | |
|---|---|---|---|---|
| 9 | INF | 1 | 1.51633 | 64.14 |
| 10 | INF | 10.63 | | |
| 11 (Virtual stop) | INF | | | |

Aspheric data $3^{rd}$ surface

K = 6.129
A4 = 8.7723E−05
A6 = 2.8774E−06
A8 = −2.8606E−08

$5^{th}$ surface

K = −0.6158
A4 = −1.4976E−04
A6 = −6.2597E−06
A8 = 1.8117E−08

$7^{th}$ surface

K = −8.4476
A4 = −3.8087E−05
A6 = 2.8003E−07
A8 = 2.9346E−09

$8^{th}$ surface

K = −1.846
A4 = −1.3206E−04
A6 = 2.1681E−07
A8 = 5.8329E−09

Variable spacing data

| Diopter | −1 | +1 | −3 |
|---|---|---|---|
| D1 | 9.8342 | 11.36621 | 8.40821 |
| D2 | 2.23898 | 0.70697 | 3.66497 |

Various data 1

| Diopter | −1 | +1 | −3 |
|---|---|---|---|
| Angle of field | 23.012608 | 23.962977 | 21.974353 |
| Focal length | 23.802408 | 23.257532 | 24.416973 |

Various data 2

| | |
|---|---|
| F1 | 52.001 |
| F2 | −14.548 |
| F3 | 12.861 |
| Total length | 28.160 |
| Pupil diameter | 8 |
| Maximum height of the display plane | 6 |

Numerical Example 4
Unit mm

Surface data

| Surface Number | r | d | nd | vd |
|---|---|---|---|---|
| 1 (Display plane) | INF | 4 | | |
| 2* | −20 | 2.5 | 1.52542 | 55.78 |
| 3 | −10.8769 | D1 (Variable) | | |
| 4* | −8.8631 | 1.8 | 1.58423 | 30.49 |
| 5 | −23.2881 | 0.7158 | | |
| 6* | 47.1663 | 5.5 | 1.52542 | 55.78 |
| 7* | −9.1749 | D2 (Variable) | | |
| 8 | INF | 1 | 1.51633 | 64.14 |
| 9 | INF | 10.63 | | |
| 10 (Virtual stop) | INF | | | |

Aspheric data $2^{nd}$ surface

K = −0.2523

$4^{th}$ surface

K = 0.8541
A4 = −4.9284E−05
A6 = −6.3191E−08
A8 = −3.7645E−09

$6^{th}$ surface

K = −6.2928
A4 = −3.3880E−05
A6 = −8.8055E−09
A8 = 1.2223E−11

$7^{th}$ surface

K = −0.3819
A4 = −5.3472E−06
A6 = 1.3554E−07
A8 = −2.0350E−10

Variable spacing data

| Diopter | −1 | +1 | −3 |
|---|---|---|---|
| D1 | 8.91406 | 9.48053 | 7.72274 |
| D2 | 1.49495 | 0.92848 | 2.68627 |

Various data 1

| Diopter | −1 | +1 | −3 |
|---|---|---|---|
| Angle of field | 23.012608 | 23.962977 | 21.974353 |
| Focal length | 23.80241 | 23.257532 | 24.416973 |

Various data 2

| | |
|---|---|
| F1 | 41.468 |
| F2 | −23.784 |
| F3 | 15.127 |
| Total length | 25.830 |
| Pupil diameter | 8 |
| Maximum height of the display plane | 6 |

Numerical Example 5
Unit mm

Surface data

| Surface Number | r | d | nd | vd |
|---|---|---|---|---|
| 1 (Display plane) | INF | 4 | | |
| 2* | −35 | 2.5 | 1.52542 | 55.78 |
| 3 | −11.196 | D1 (Variable) | | |
| 4* | −12.8996 | 1.8 | 1.63218 | 23.26 |

-continued

Numerical Example 5
Unit mm

| | | | | |
|---|---|---|---|---|
| 5 | −90.9121 | 1.2147 | | |
| 6 | 36.6546 | 5.5 | 1.52542 | 55.78 |
| 7* | −10.3836 | D2 (Variable) | | |
| 8 | INF | 1 | 1.51633 | 64.14 |
| 9 | INF | 10.63 | | |
| 10 (Virtual stop) | INF | | | |

Aspheric data $2^{nd}$ surface

K = −10.362

$4^{th}$ surface

K = 2.0067
A4 = −8.0055E−05
A6 = 9.0883E−08
A8 = 9.3257E−09

$7^{th}$ surface

K = −0.4791
A4 = −1.6964E−05
A6 = 3.2996E−07
A8 = −1.1875E−09

Variable spacing data

| Diopter | −1 | +1 | −3 |
|---|---|---|---|
| D1 | 11.11527 | 12.78795 | 9.59585 |
| D2 | 2.43967 | 0.767 | 3.9591 |

Various data 1

| Diopter | −1 | +1 | −3 |
|---|---|---|---|
| Angle of field | 23.641279 | 24.535416 | 22.596485 |
| Focal length | 22.263433 | 21.429865 | 23.259421 |

Various data 2

| | |
|---|---|
| F1 | 30.237 |
| F2 | −23.994 |
| F3 | 16.046 |
| Total length | 29.560 |
| Pupil diameter | 8 |
| Maximum height of the display plane | |

Numerical Example 6
Unit mm

Surface data

| Surface Number | r | d | nd | vd |
|---|---|---|---|---|
| 1 (Display plane) | INF | 1.2 | 1.51633 | 64.14 |
| 2 | INF | 3.5 | | |
| 3* | −35 | 2.5 | 1.52542 | 55.78 |
| 4 | −28.6713 | D1 (Variable) | | |
| 5* | −6.18 | 1.8 | 1.63218 | 23.26 |
| 6 | −20.1095 | 0.4658 | | |
| 7* | 18.8508 | 5.5 | 1.52542 | 55.78 |
| 8* | −9.1665 | D2 (Variable) | | |
| 9 | INF | 1 | 1.51633 | 64.14 |
| 10 | INF | 10.63 | | |
| 11 (Virtual stop) | INF | | | |

Numerical Example 6
Unit mm

Aspheric data $3^{rd}$ plane

K = 10.0153
A4 = 1.8908E−04
A6 = 3.0811E−06
A8 = −8.4327E−08

$5^{th}$ plane

K = −0.5976
A4 = −1.9790E−04
A6 = −5.3862E−06
A8 = 4.4662E−08

$7^{th}$ plane

K = −5.8579
A4 = −2.8566E−05
A6 = 2.8408E−07
A8 = 2.2586E−09

$8^{th}$ plane

K = −1.9231
A4 = −1.2514E−04
A6 = 2.9538E−07
A8 = 6.7974E−09

Variable spacing data

| Diopter | −1 | +1 | −3 |
|---|---|---|---|
| D1 | 9.67194 | 10.94249 | 8.48931 |
| D2 | 1.97133 | 0.70078 | 3.15395 |

Various data 1

| Diopter | −1 | +1 | −3 |
|---|---|---|---|
| Angle of field | 23.065187 | 22.22479 | 23.815602 |
| Focal length | 24.002709 | 24.112469 | 23.901439 |

Various data 2

| | |
|---|---|
| F1 | 265.638 |
| F2 | −16.035 |
| F3 | 12.590 |
| Total length | 27.378 |
| Pupil diameter | 8 |
| Maximum height of the display plane | 6 |

Aberrational diagrams for Examples 1 to 6 are attached thereto as FIGS. 7 to 12. In these aberrational diagrams, (a), (b) and (c) are indicative of spherical aberrations (AS), distortion (DT) and chromatic aberration of magnification (CC) at −1 diopter, +1 diopter, and −3 diopters, respectively, and φ and FIY are indicative of pupil diameter and the maximum height of the display plane, respectively.

Set out below are the values of conditions (1) to (8) in Examples 1 to 6.

|  | Example 1 | Example 2 | Example 3 | Example 4 | Example 5 | Example 6 |
| --- | --- | --- | --- | --- | --- | --- |
| Condition (1) | 4.921 | 1.286 | 2.631 | 3.384 | 1.941 | 10.061 |
| Condition (2) | −1.776 | −1.780 | −1.763 | −2.229 | −1.331 | −1.887 |
| Condition (3) | 3.489 | 1.552 | 2.185 | 2.020 | 1.358 | 11.067 |
| Condition (4) | −0.588 | −0.678 | −0.611 | −1.158 | −1.078 | −0.668 |
| Condition (5) | 0.521 | 0.578 | 0.540 | 0.737 | 0.721 | 0.525 |
| Condition (6) | 26.582 | 10.029 | 15.389 | 10.367 | 12.095 | 75.897 |
| Condition (7) | 0.374 | 0.342 | 0.388 | 0.674 | 0.559 | 0.346 |
| Condition (8) | −0.682 | −0.644 | −0.676 | −0.375 | −0.463 | −0.603 |

The eyepiece optical system and electronic view finder according to the second aspect of the invention are now explained with reference to FIGS. 13 to 28.

FIGS. 13 to 20 are illustrative of the electronic view finders of Examples 7 to 14, respectively. In each figure, (a), (b) and (c) are illustrative of states at −1 diopter, +4 diopters (+2.6 diopters in Example 14) and −4 diopters (−3.8 diopters in Example 14). FIGS. 21 to 28 are aberrational diagrams for the eyepiece optical systems of Examples 7 to 14, respectively.

Figure 13:
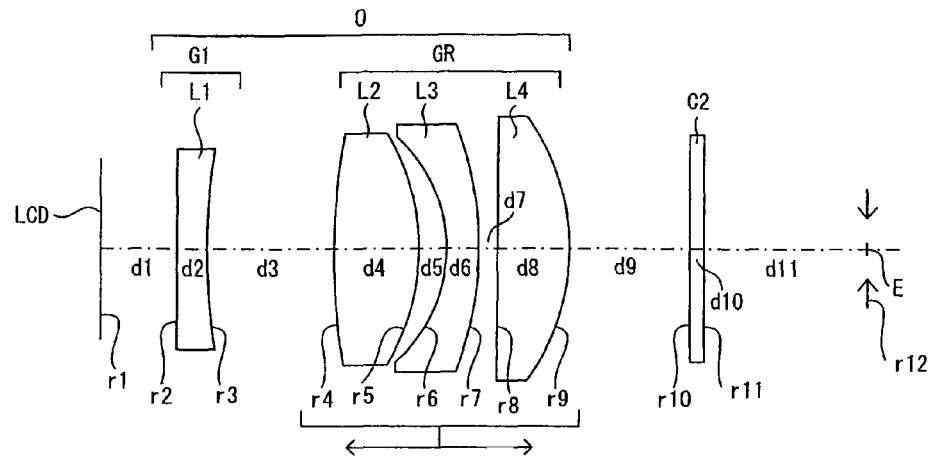
FIG. 13 is an exploded sectional view of the eyepiece optical system of Example 7 according to the invention as taken along an optical axis.
Figure 13:
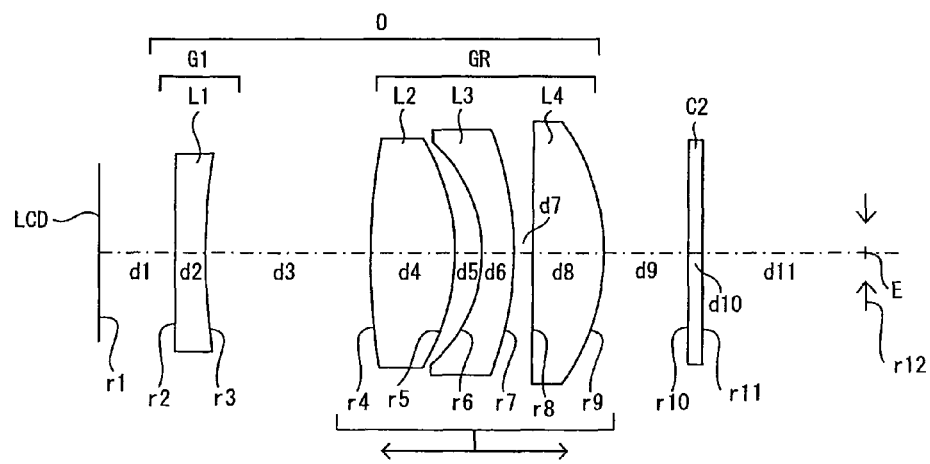
Figure 13:
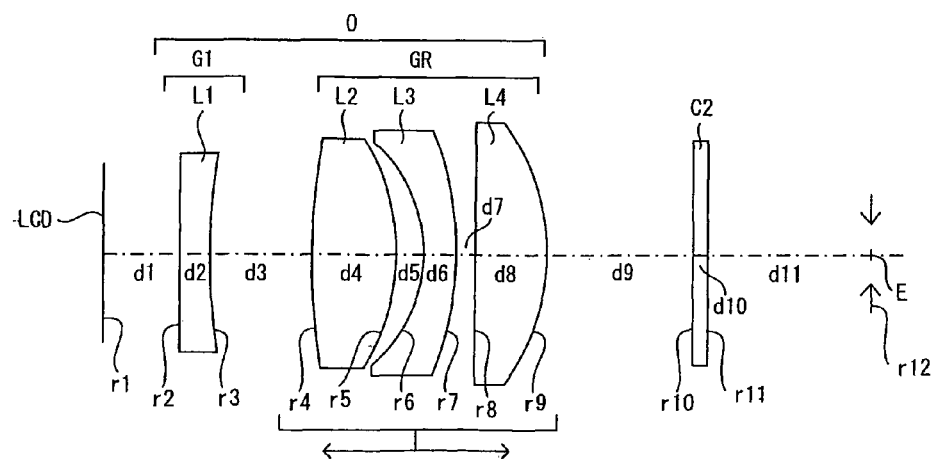
Figure 14:
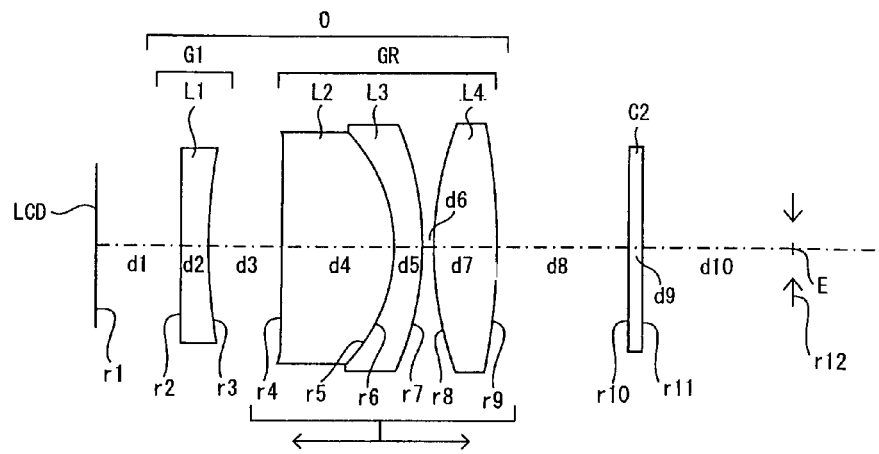
FIG. 14 is an exploded sectional view of the eyepiece optical system of Example 8 according to the invention as taken along an optical axis.
Figure 14:
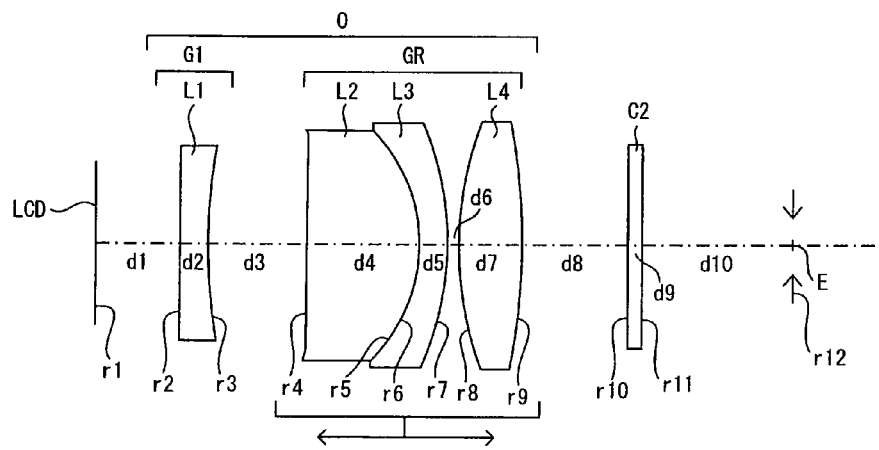
Figure 14:
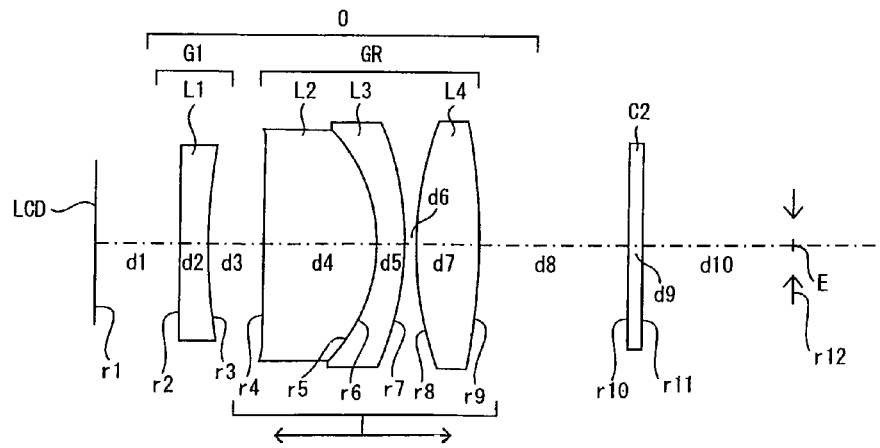
Figure 15:
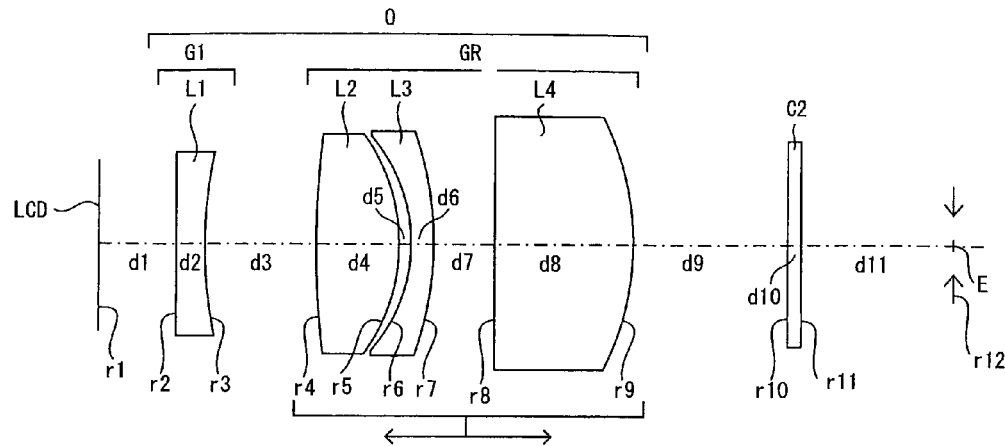
FIG. 15 is an exploded sectional view of the eyepiece optical system of Example 9 according to the invention as taken along an optical axis.
Figure 15:
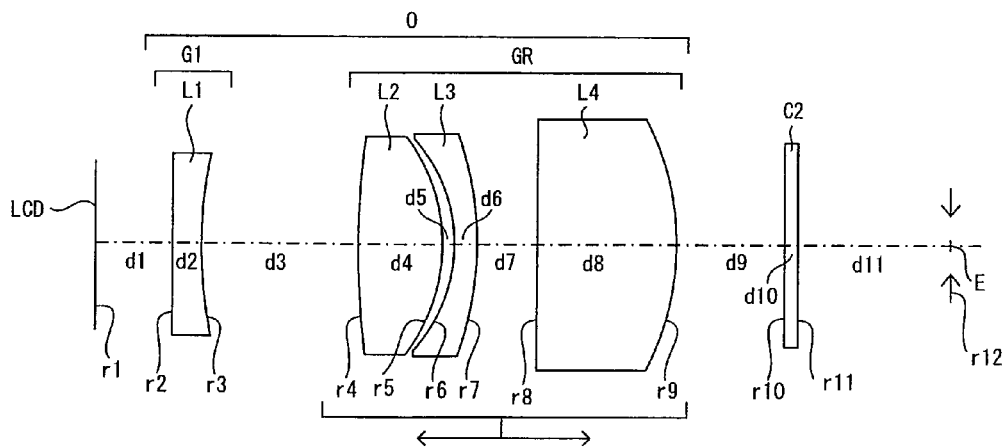
Figure 15:
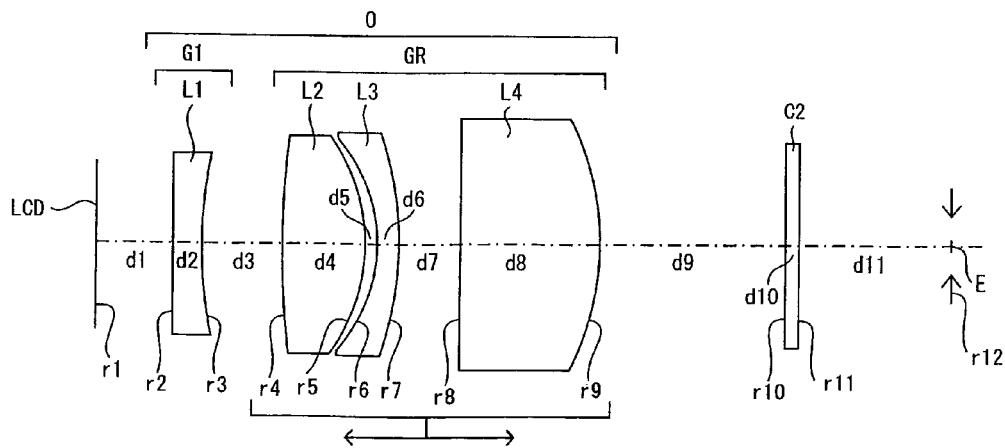
Figure 16:
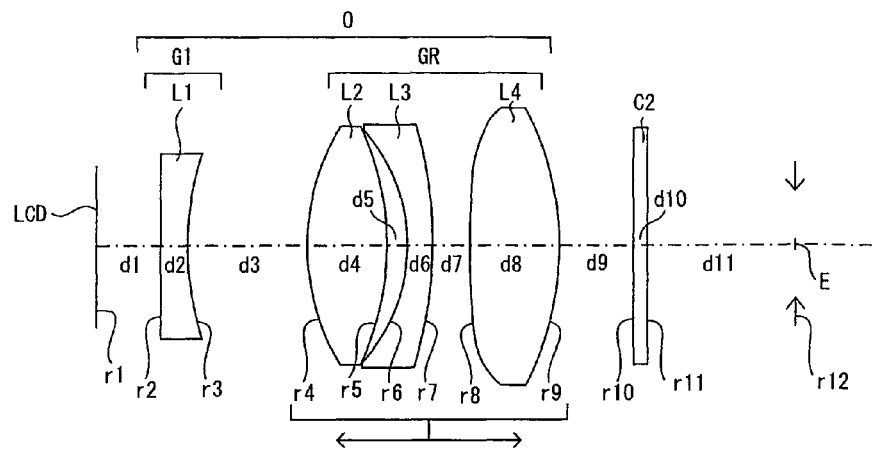
FIG. 16 is an exploded sectional view of the eyepiece optical system of Example 10 according to the invention as taken along an optical axis.
Figure 16:
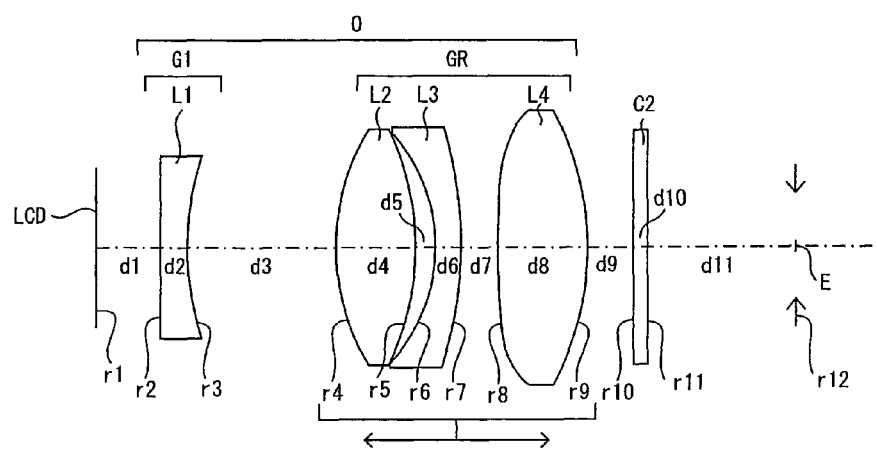
Figure 16:
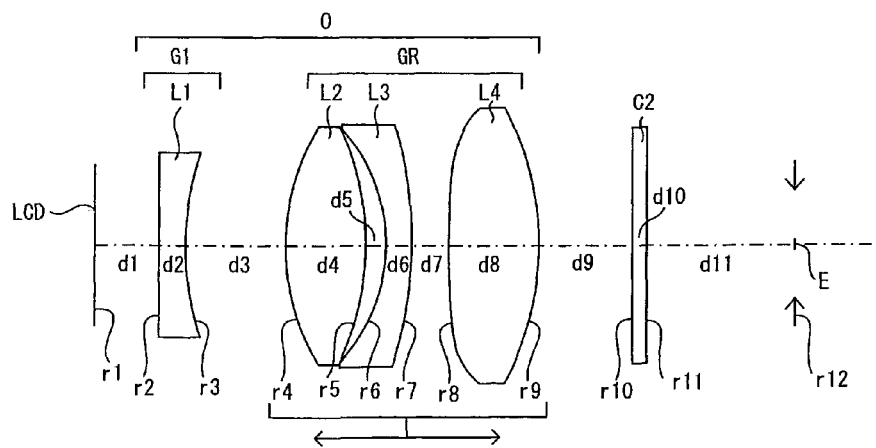
Figure 17:
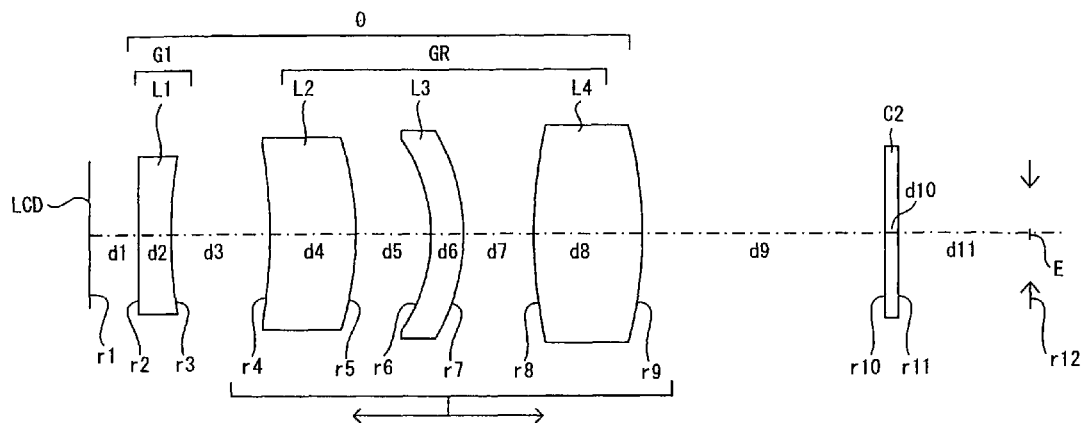
FIG. 17 is an exploded sectional view of the eyepiece optical system of Example 11 according to the invention as taken along an optical axis.
Figure 17:
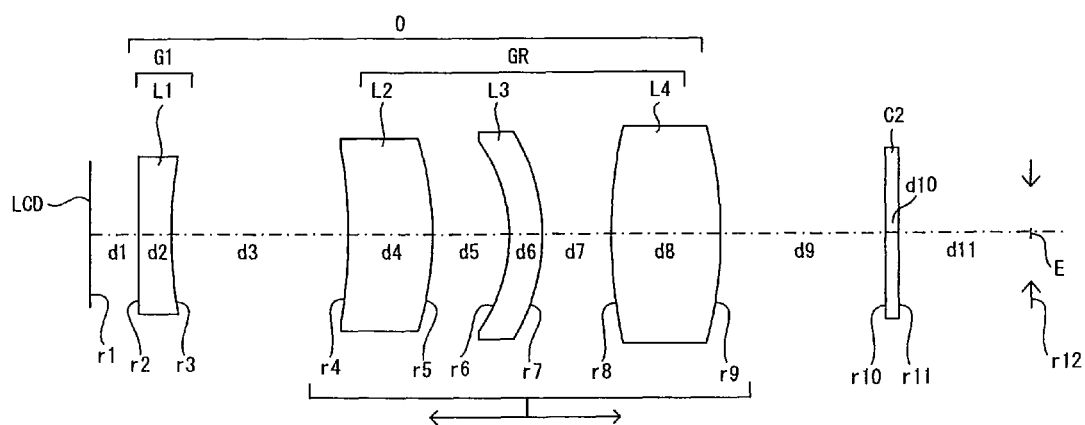
Figure 17:
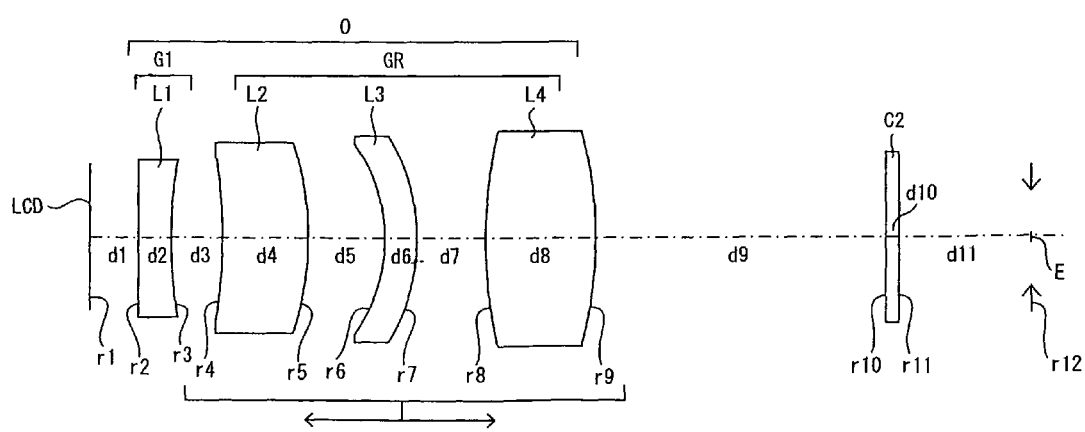
Figure 18:
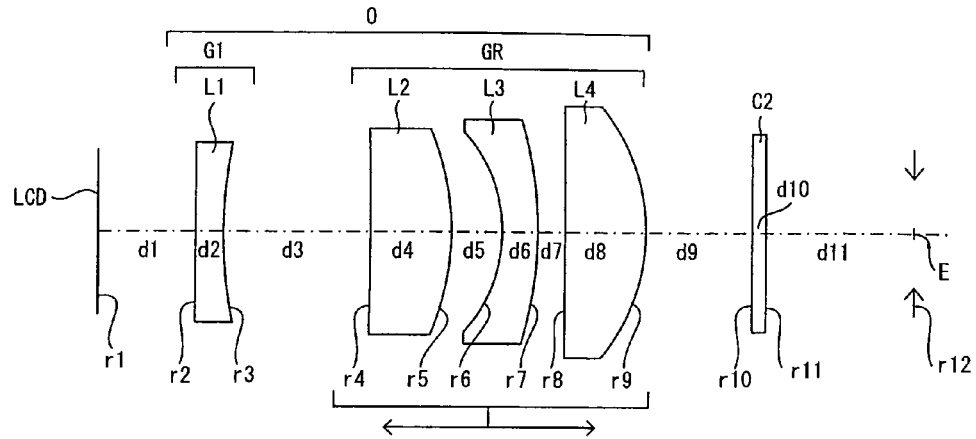
FIG. 18 is an exploded sectional view of the eyepiece optical system of Example 12 according to the invention as taken along an optical axis.
Figure 18:
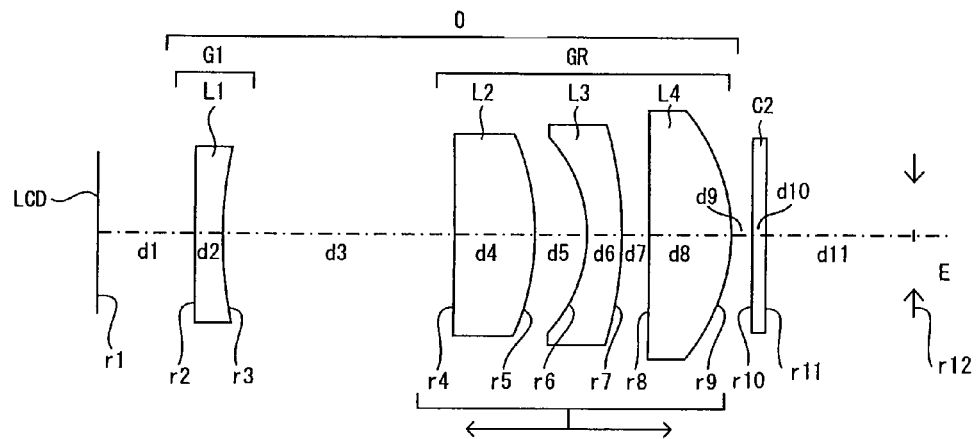
Figure 18:
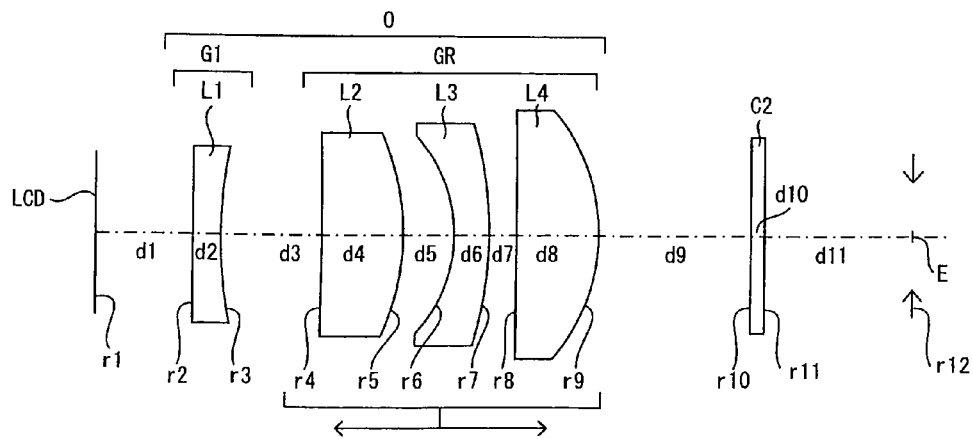
Figure 19:
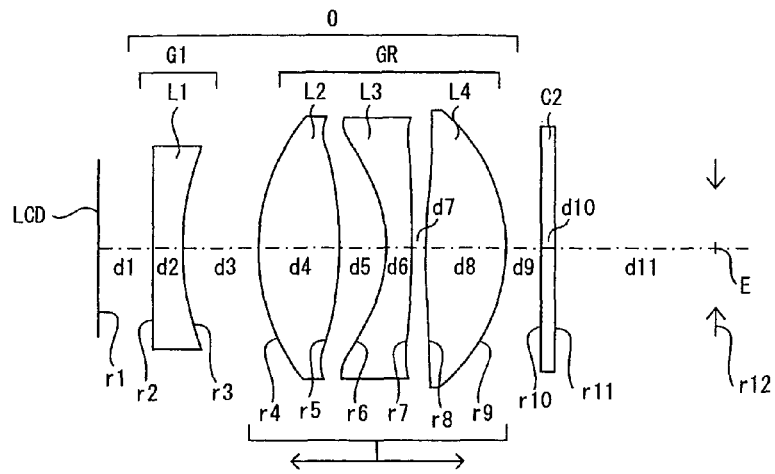
FIG. 19 is an exploded sectional view of the eyepiece optical system of Example 13 according to the invention as taken along an optical axis.
Figure 19:
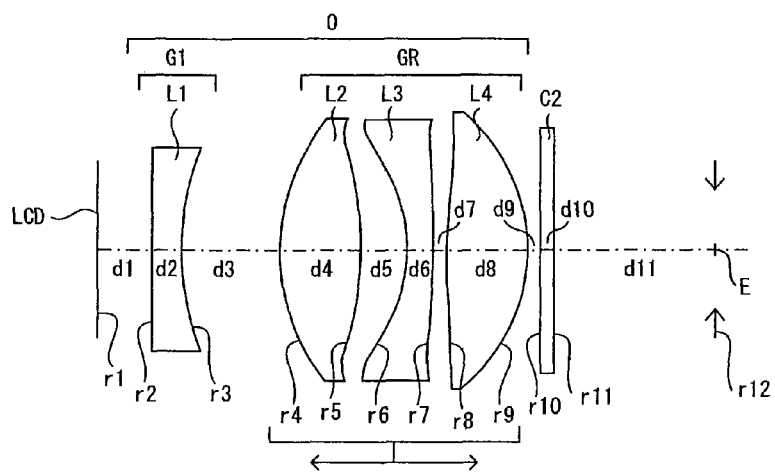
Figure 19:
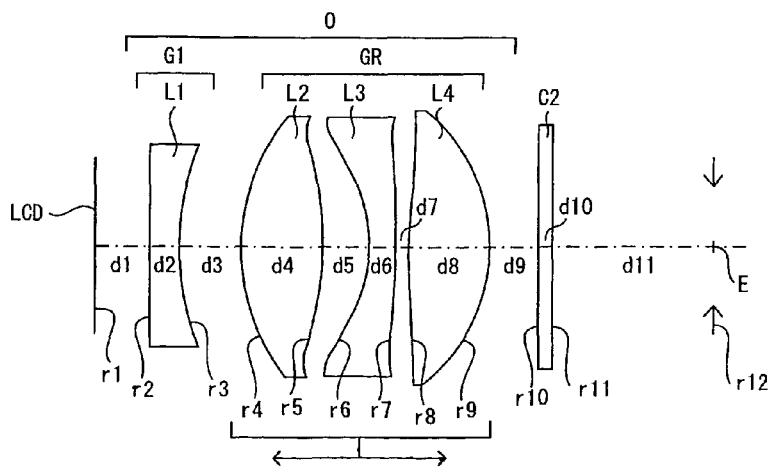
Figure 20:
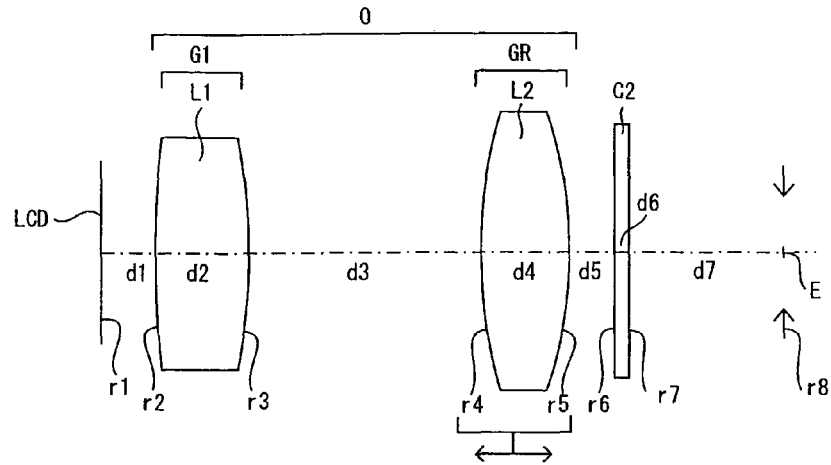
FIG. 20 is an exploded sectional view of the eyepiece optical system of Example 14 according to the invention as taken along an optical axis.
Figure 20:
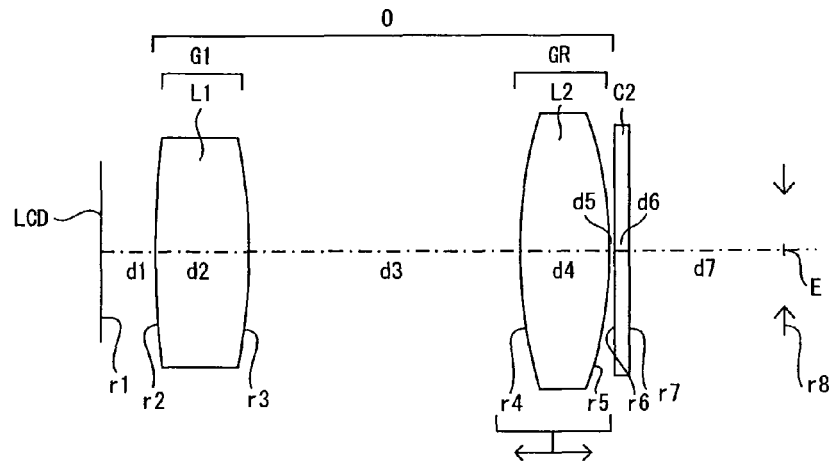
Figure 20:
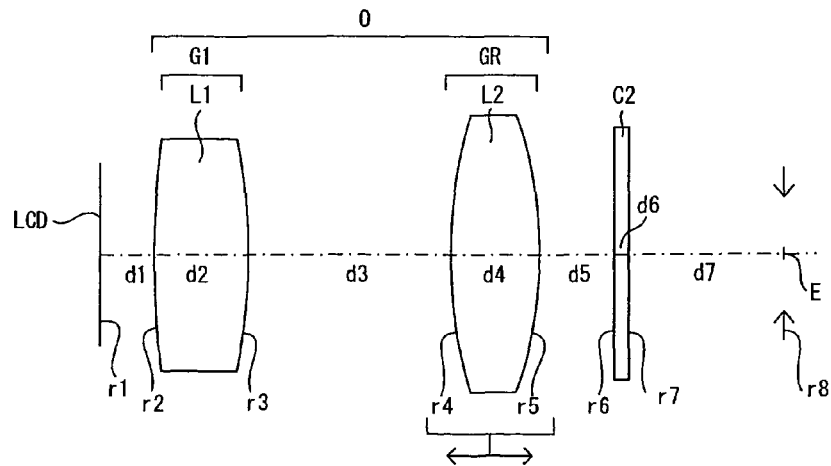
Figure 21:
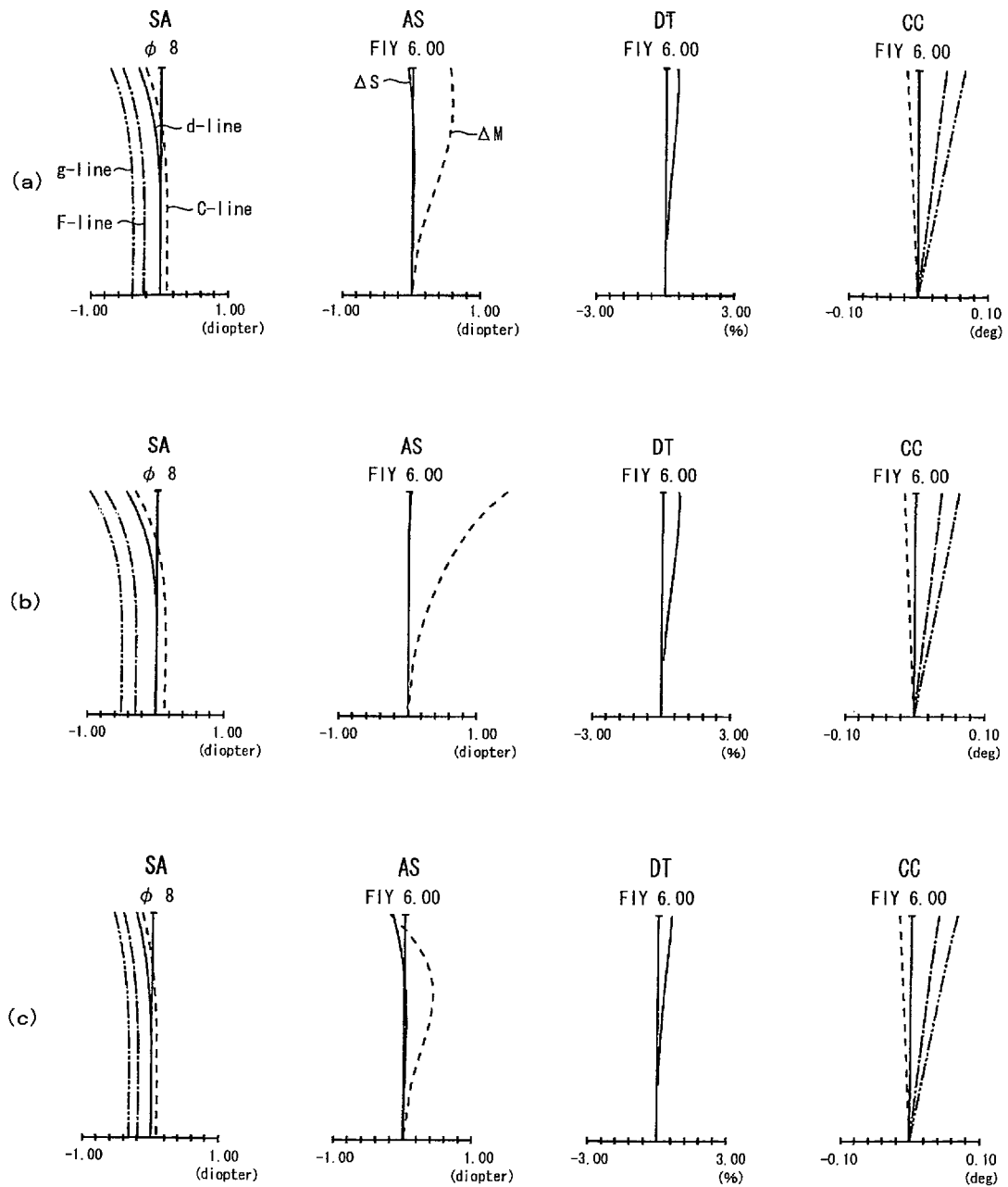
FIG. 21 is an aberrational diagram for the eyepiece optical system of Example 7 according to the invention.
Figure 22:
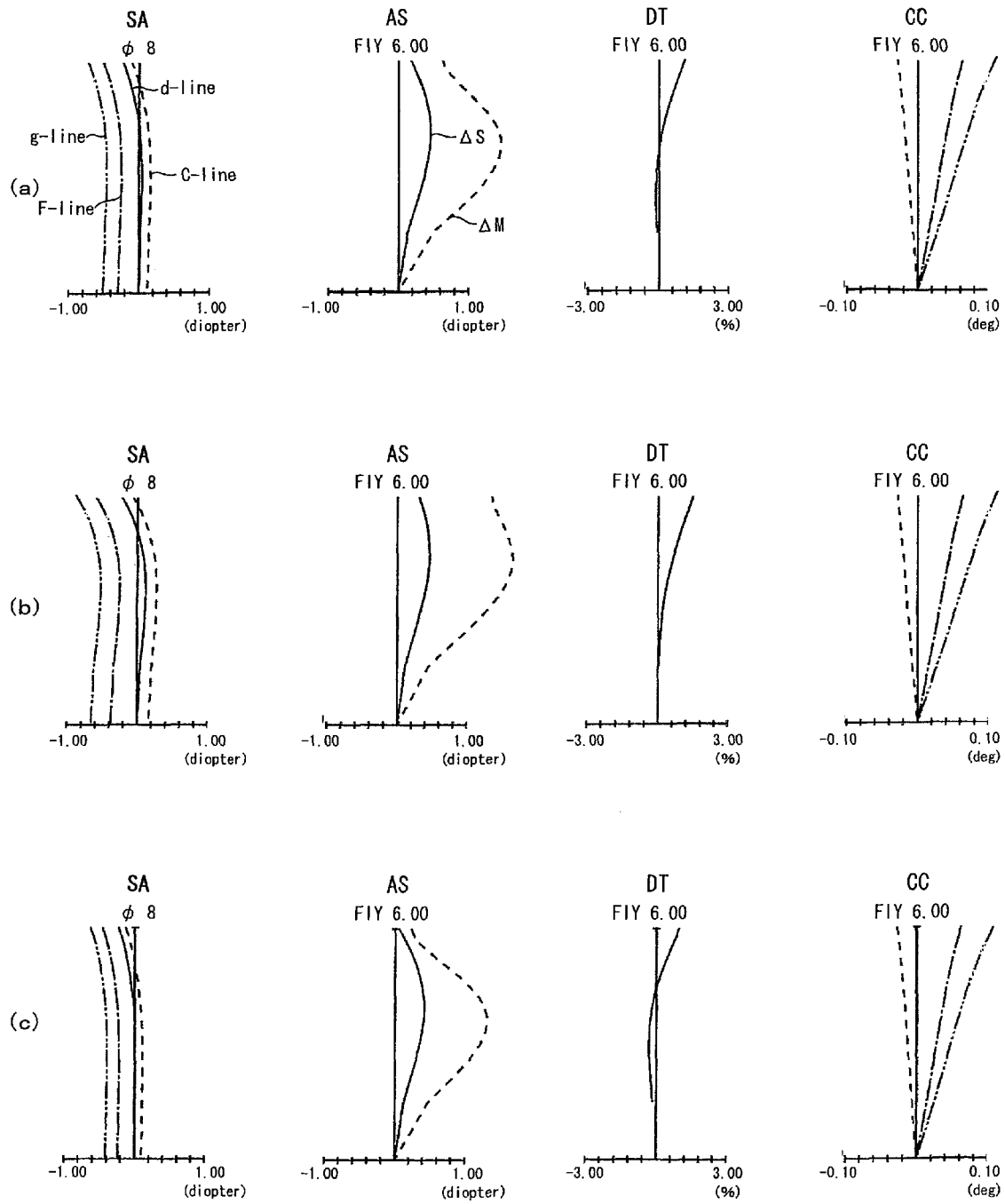
FIG. 22 is an aberrational diagram for the eyepiece optical system of Example 8 according to the invention.
Figure 23:
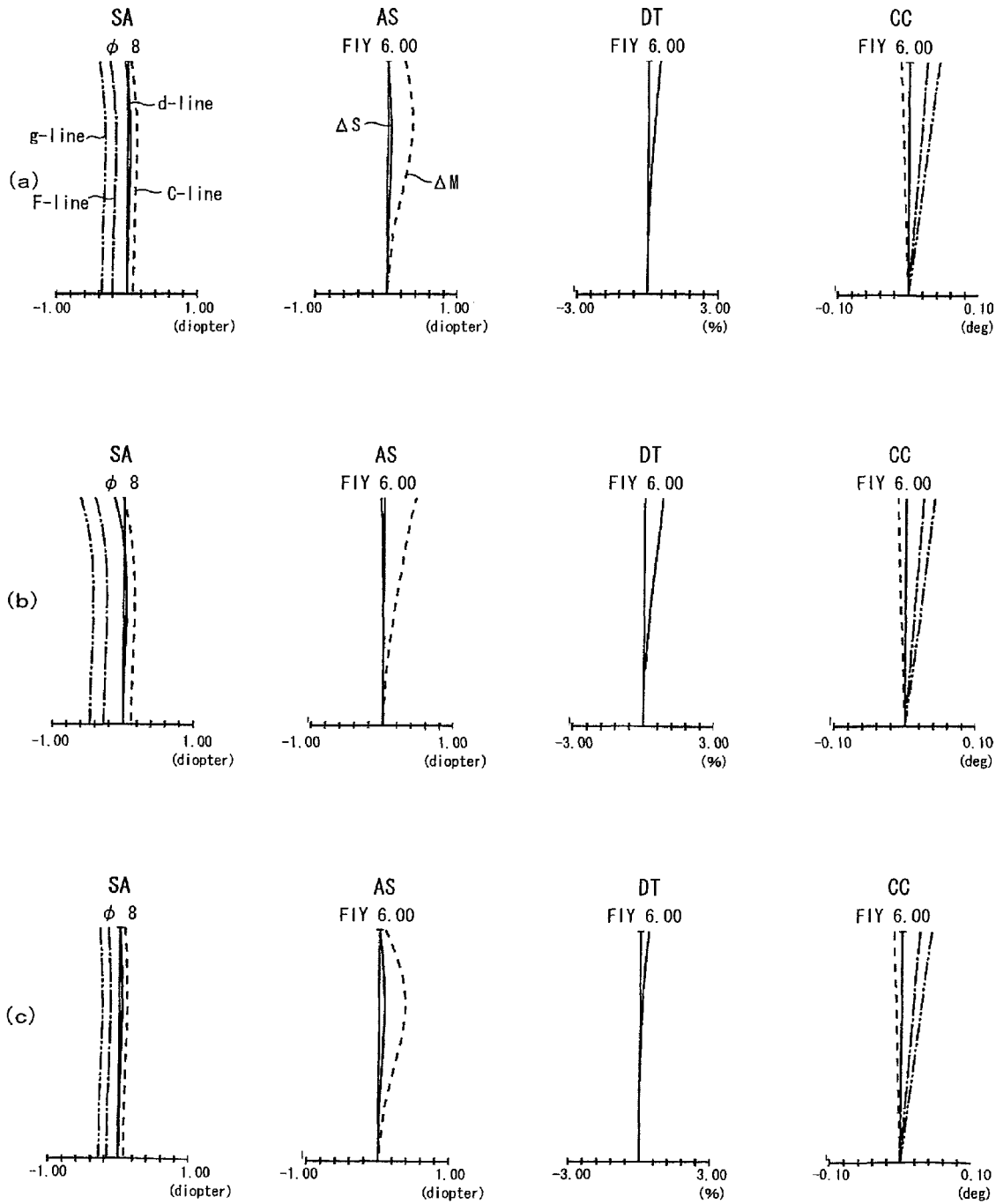
FIG. 23 is an aberrational diagram for the eyepiece optical system of Example 9 according to the invention.
Figure 24:
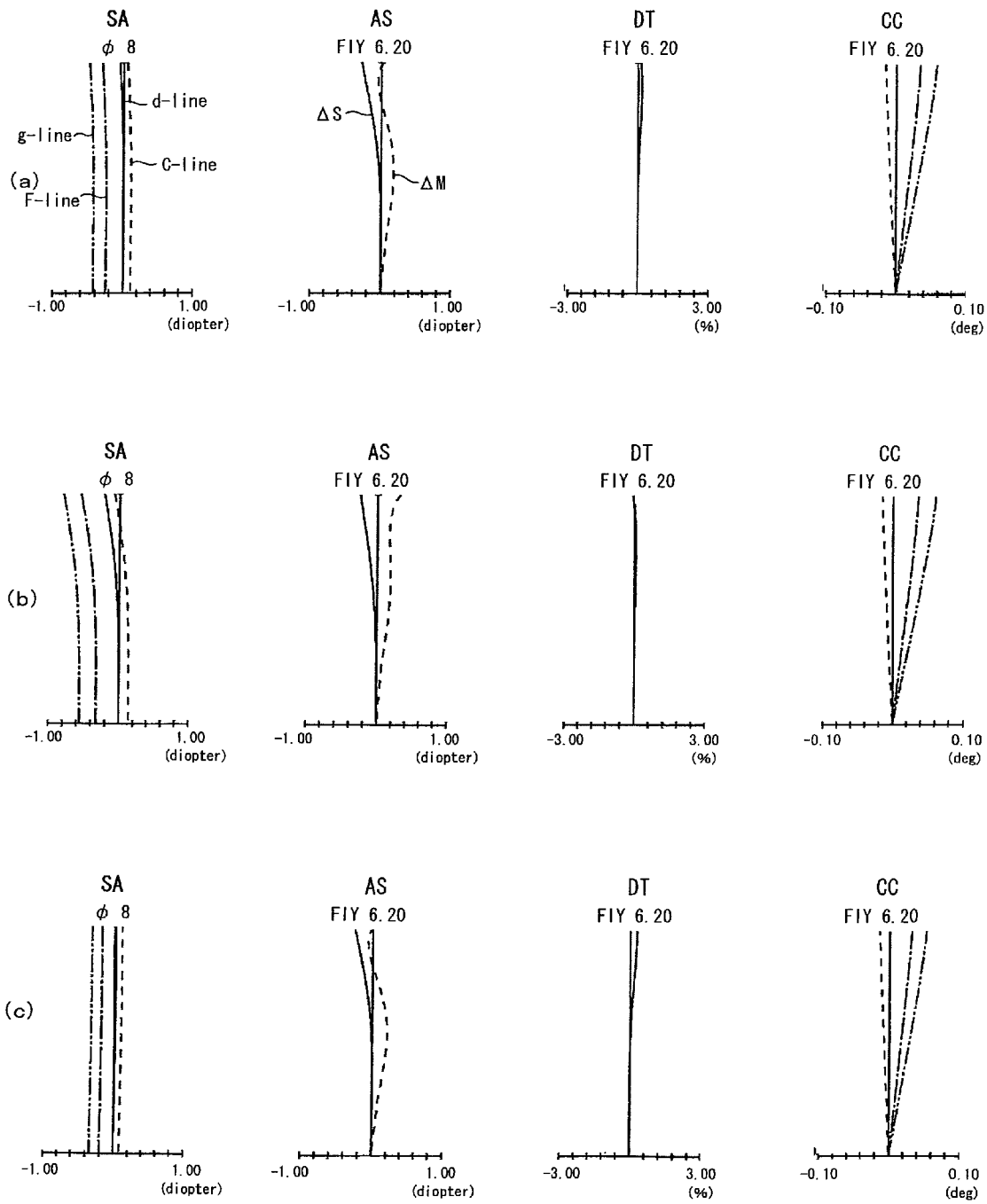
FIG. 24 is an aberrational diagram for the eyepiece optical system of Example 10 according to the invention.
Figure 25:
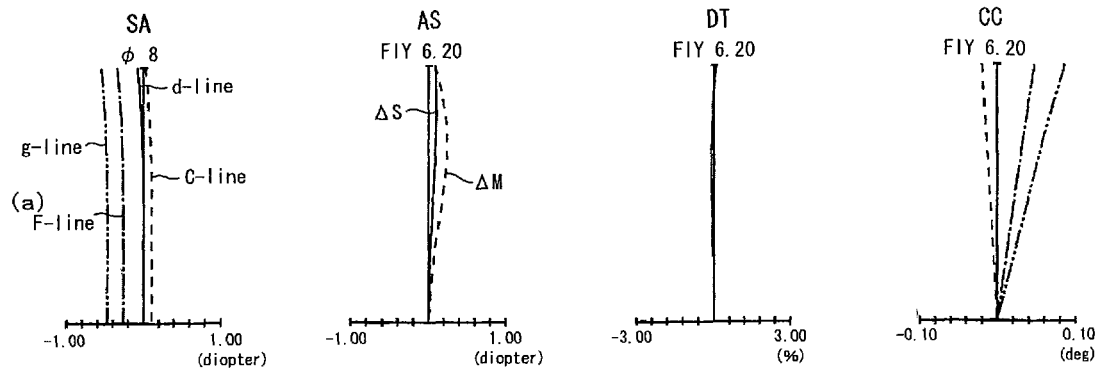
FIG. 25 is an aberrational diagram for the eyepiece optical system of Example 11 according to the invention.
Figure 25:
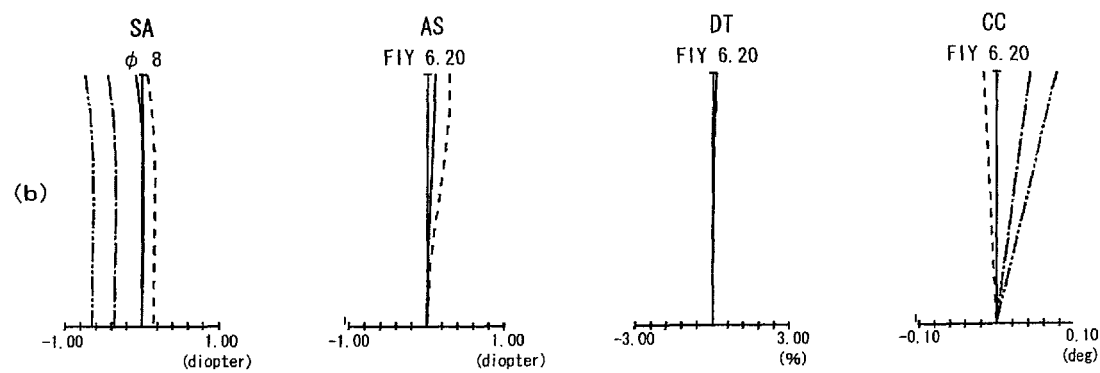
Figure 25:
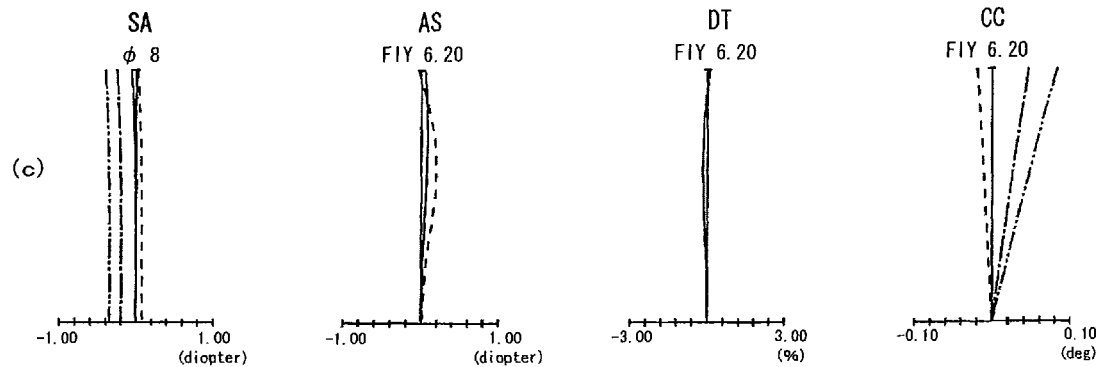
Figure 26:
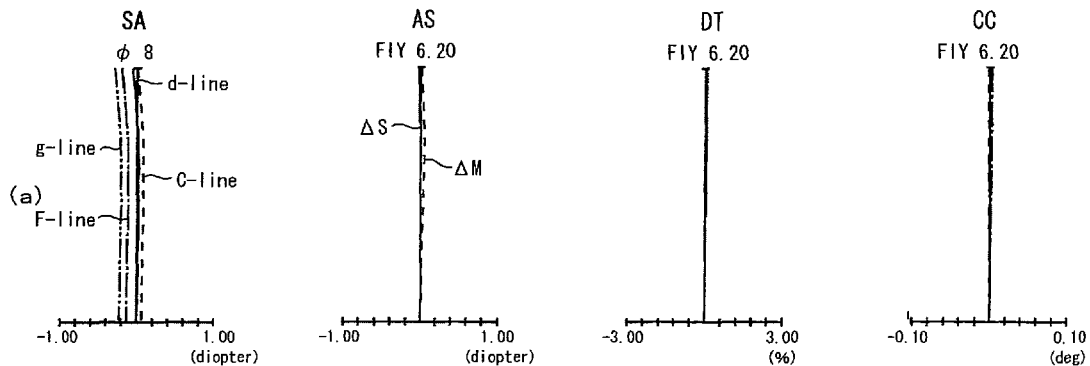
FIG. 26 is an aberrational diagram for the eyepiece optical system of Example 12 according to the invention.
Figure 26:
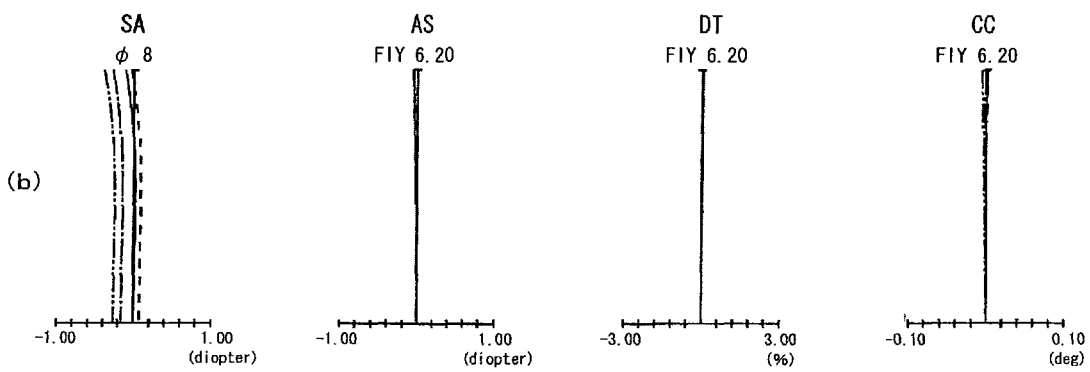
Figure 26:
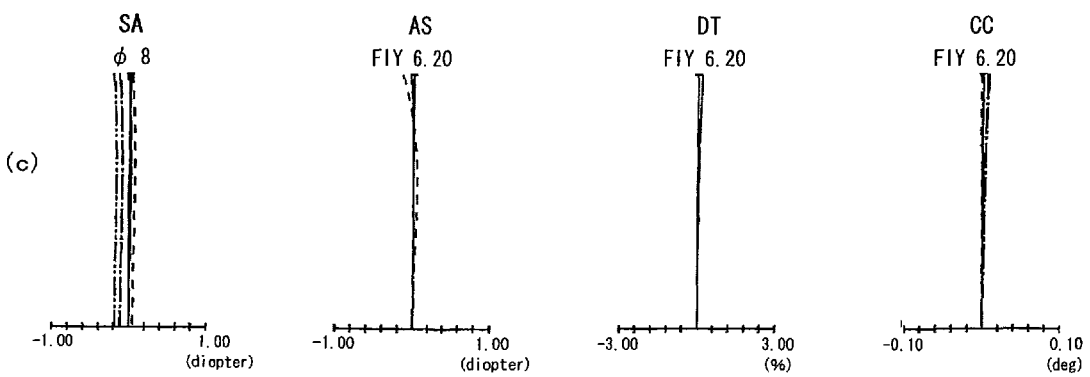
Figure 27:
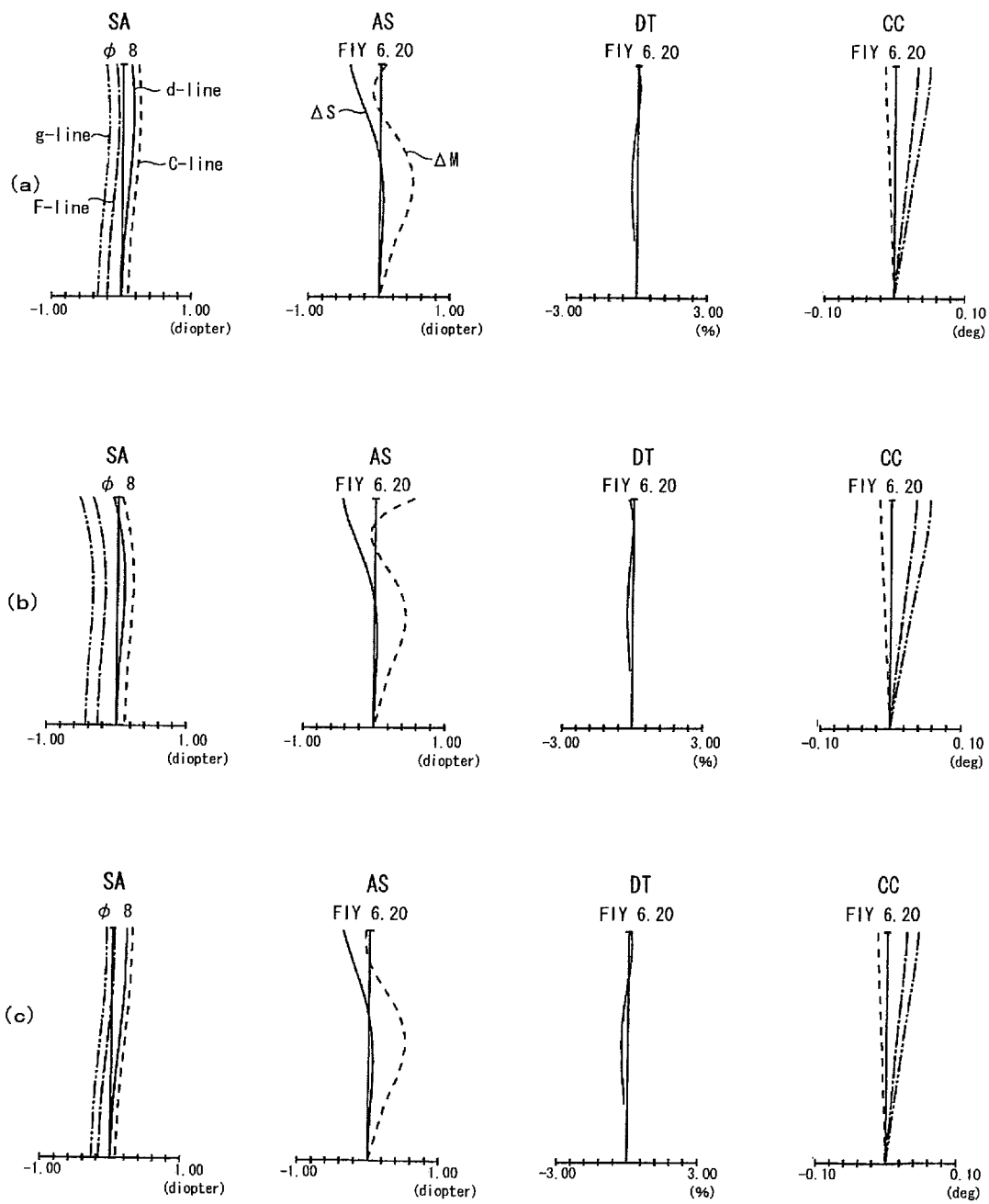
FIG. 27 is an aberrational diagram for the eyepiece optical system of Example 13 according to the invention.
Figure 28:
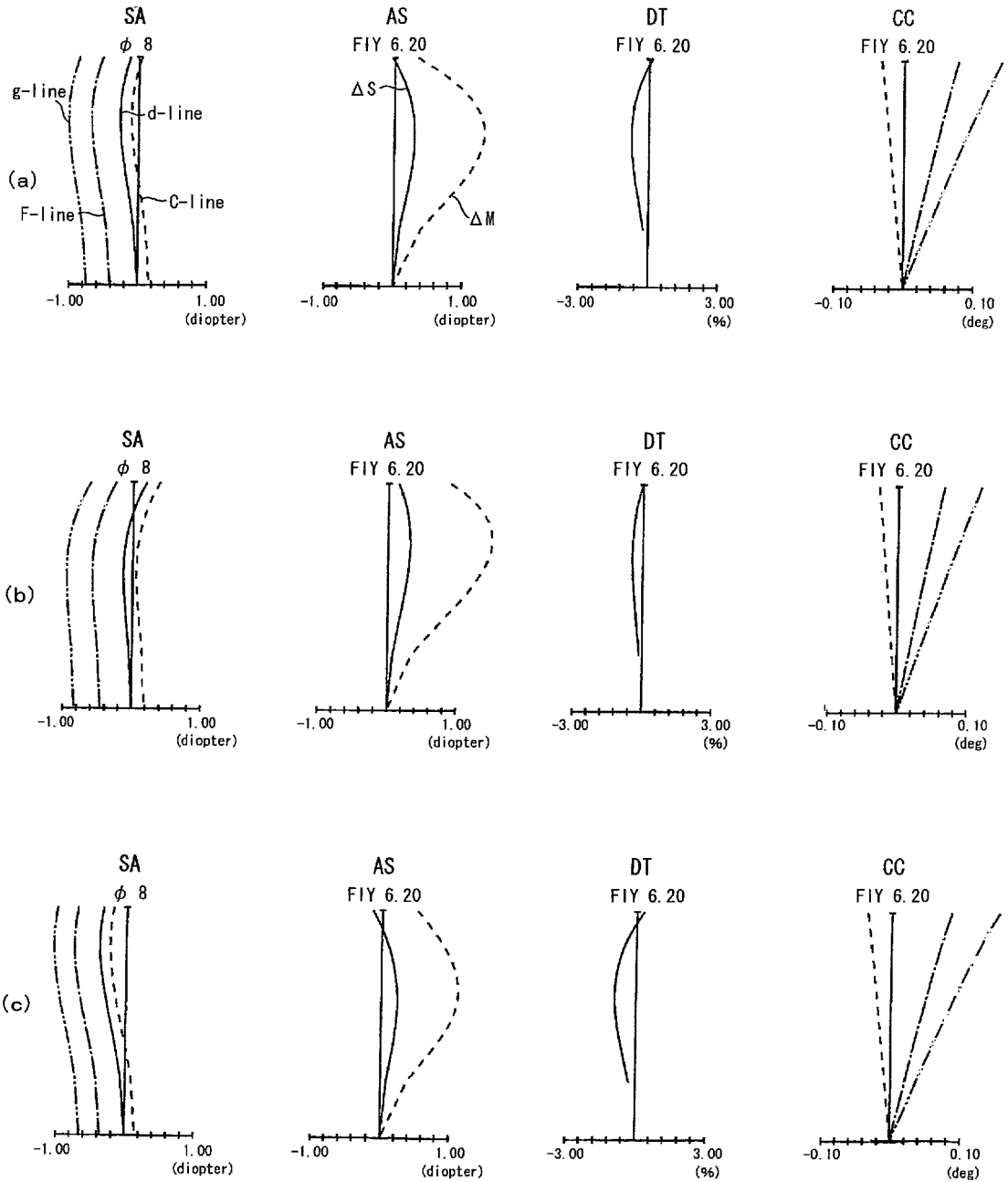
FIG. 28 is an aberrational diagram for the eyepiece optical system of Example 14 according to the invention.

FIG. 13 is an exploded sectional view of the eyepiece optical system of Example 7 according to the second aspect of the invention, as taken along an optical axis.

The electronic view finder of Example 7 comprises a liquid crystal display device LCD adapted to display an object image and an eyepiece optical system O. In FIG. 13, E is indicative of an eye point (virtual stop).

The display screen of the liquid crystal display device LCD is sized in a rectangular form having a long side of 9.6 mm and a short side of 7.2 mm, and the display plane of the eyepiece optical system O is designed to have a maximum height of 6 mm.

The eyepiece optical system O is made up of, in order from the display plane (object side) on which the liquid crystal display device LCD is installed toward a viewing (exit) side, a first lens group G1 and a rear lens group GR.

The first lens group G1 is made up of a single lens L1 that has negative refracting power and is in a plano-concave configuration having a planar object-side surface.

The rear lens group GR is made up of, in order from its object side, a single lens L2 that has positive refracting power and is a double-convex configuration, a single lens L3 that has negative refracting power and is in a meniscus configuration concave on its object side, and a single lens L4 that has positive refracting power and is in a meniscus configuration concave on its object side.

This example is designed in terms of values as calculated on an air basis without recourse to the cover glass C1 or the like provided on the display plane of the liquid crystal display device LCD. However, when there is the cover glass provided, additional surfaces are provided or the values of spacing are adjusted depending on the thickness and refractive index of the cover glass. Further, an exit window member C2 is provided on the exit side of the eyepiece optical system O so as to prevent entrance of dusts into the optical system.

With regard to the cover glass C1 and exit window member C2, the same will apply hereinafter.

Diopter adjustment is implemented by movement in unison of the rear lens group GR (lenses L2, L3 and L4) in the optical axis direction. This rear lens group GR is moved toward the exit side so as to increase diopter and toward the object side so as to decrease diopter.

FIGS. 14 to 20 are exploded sectional views of the eyepiece optical systems of Examples 8 to 14, respectively, as taken along the optical axis.

In Example 8, the first lens group G1 is made up of a single lens L1 that has negative refracting power and is in a meniscus configuration convex on its object side.

The rear lens group GR is made up of, in order from its object side, a cemented lens component of a lens L2 that has positive refracting power and is in a double-convex configuration and a lens L3 that has negative refracting power and is in a meniscus configuration concave on its object side, and a single lens L4 that has positive refracting power and is a double-convex configuration.

In Example 9, the first lens group G1 is made up of a single lens L1 in a plano-concave configuration having a planar object-side surface.

The rear lens group GR is made up of, in order from its object side, a single lens L2 that has positive refracting power and is in a double-convex configuration, a single lens L3 that has negative refracting power and is a meniscus configuration concave on its object side, and a single lens L4 that has positive refracting power and is a meniscus configuration concave on its object side.

In Example 10, the first lens group G1 is made up of a single lens L1 that has negative refracting power and is in a plano-concave configuration having a planar object-side surface.

The rear lens group GR is made up of, in order from its object side, a single lens L2 that has positive refracting power and is in a double-convex configuration, a single lens L3 that has negative refracting power and is in a meniscus configuration concave on its object side, and a single lens L4 that has positive refracting power and is in a double-convex configuration.

In Example 11, the first lens group G1 is made up of a single lens L1 that has negative refracting power and is in a plano-concave configuration having a planar object-side surface.

The rear lens group GR is made up of, in order from its object side, a single lens L2 that has negative refracting power and is in a meniscus configuration concave on its object side, a single lens L3 that has negative refracting power and is in a meniscus configuration concave on its object side, and a single lens L3 that has positive refracting power and is in a double-convex configuration.

In Example 12, the first lens group G1 is made up of a single lens L1 that has negative refracting power and is in a plano-concave configuration having a planar object-side surface.

The rear lens group GR is made up of, in order from its object side, a single lens L2 that has positive refracting power and is in a meniscus configuration concave on its object side, a single lens L3 that has negative refracting power and is in a meniscus configuration concave on its object side, and a single lens L3 that has positive refracting power and is in a meniscus configuration concave on its object side.

In Example 13, the first lens group G1 is made up of a single lens L1 that has negative refracting power and is in a double-convex configuration.

The rear lens group GR is made up of, in order from its object side, a single lens L2 that has positive refracting power and is in a double-convex configuration, a single lens L3 that has negative refracting power and is in a meniscus configuration concave on its object side, and a single lens L4 that has positive refracting power and is in a double-convex configuration.

In Example 14, the first lens group G1 is made up of a single lens L1 that has positive refracting power and is in a double-convex configuration.

The rear lens group GR is made up of, a single lens L2 that has positive refracting power and is in a double-convex configuration.

In Examples 8 through 14, too, diopter adjustment is implemented by movement in unison of the rear lens group GR in the optical axis direction.

Set out below are various numerical data on Examples 7 to 14 (surface data, aspheric data, variable spacing data, various data 1, various data 2). The explanation of designations is omitted because they are the same as in Example 1, etc.

Variable spacing data include surface-to-surface spaces d that change upon diopter adjustment by movement of the rear lens group GR, and are given by figures at −1 diopter, +4 diopter (+2.6 diopters in Example 14), and −4 diopter (−3.8 diopters in Example 14).

Various data 1 includes the angle of field of the eyepiece optical system O that changes upon diopter adjustment by movement of the rear lens group GR, and the focal length of the whole eyepiece optical system at −1 diopter.

Various data 2 include the focal length F1 of the first lens group G1, the focal length FR of the rear lens group GR, total length, pupil diameter, and the maximum height of the display plane. Note here that the total length is the distance from the display plane of the liquid crystal display device LCD to the exit-side surface of the exit window member C2.

Numerical Example 7
Unit mm

Surface data

| Surface Number | r | d | nd | vd |
|---|---|---|---|---|
| 1 (Display plane) | INF | 5.0000 | | |
| 2 | INF | 2.0000 | 1.58423 | 30.49 |
| 3 | 46.0000 | D1 (Variable) | | |
| 4 | 44.5848 | 5.5154 | 1.53110 | 55.91 |
| 5 | −15.4708 | 1.7813 | | |
| 6 | −10.2337 | 2.1142 | 1.58423 | 30.49 |
| 7 | −22.9770 | 1.3613 | | |
| 8 | −234.3065 | 4.6039 | 1.53110 | 55.91 |
| 9* | −15.3758 | D2 (Variable) | | |
| 10 | INF | 1.0000 | 1.49236 | 57.86 |
| 11 | INF | 10.6300 | | |
| 12 (Virtual stop) | INF | | | |

Aspheric data

9$^{th}$ surface

K = −2.2594
A4 = −5.4397E−05
A6 = −4.5991E−07
A8 = 2.2643E−09

Variable spacing data

| Diopter | −1.0 | +4.0 | −4.0 |
|---|---|---|---|
| D1 | 8.2624 | 10.9672 | 6.6253 |
| D2 | 7.9130 | 5.2082 | 9.5501 |

Various data 1

| Diopter | −1.0 | +4.0 | −4.0 |
|---|---|---|---|
| Angle of field | 25.0692 | 24.1664 | 25.6492 |
| Focal length | 27.2333 | 27.0564 | 27.0413 |

Various data 2

| | |
|---|---|
| F1 | −78.7361 |
| FR | 23.0519 |
| Total length | 39.5515 |
| Pupil Diameter | 8 |
| Maximum height of the display plane | 6 |

Numerical Example 8
Unit mm

| Surface Number | r | d | nd | vd |
|---|---|---|---|---|
| 1 (Display plane) | INF | 6.0000 | | |
| 2 | 411.8765 | 2.0000 | 1.58423 | 30.49 |
| 3 | 46.1570 | D1 (Variable) | | |
| 4* | 867.4301 | 8.0000 | 1.53110 | 55.91 |
| 5 | −12.1000 | 0.0000 | | |
| 6 | −12.1000 | 2.0000 | 1.58423 | 30.49 |
| 7* | −23.4974 | 0.8059 | | |
| 8 | 29.0601 | 4.5000 | 1.53110 | 55.91 |
| 9 | −43.5767 | D2 (Variable) | | |
| 10 | INF | 1.0000 | 1.49236 | 57.86 |
| 11 | INF | 10.6300 | | |
| 12 (Virtual stop) | INF | | | |

Aspheric data

4$^{th}$ surface

K = 3.5267
A4 = 4.2234E−05
A6 = −1.2742E−06
A8 = 4.5325E−10

7$^{th}$ surface

K = −0.1003
A4 = 5.3189E−05
A6 = −1.0472E−06
A8 = 4.4756E−09

Variable spacing data

| Diopter | −1.0 | +4.0 | −4.0 |
|---|---|---|---|
| D1 | 5.2766 | 7.2033 | 4.0336 |
| D2 | 9.3872 | 7.4605 | 10.6302 |

Various data 1

| Diopter | −1.0 | +4.0 | −4.0 |
|---|---|---|---|
| Angle of field | 31.0425 | 31.3931 | 30.5556 |
| Focal length | 21.8903 | 21.3872 | 22.2276 |

Various data 2

| | |
|---|---|
| F1 | −89.1558 |
| FR | 20.1094 |
| Total length | 38.9696 |
| Pupil diameter | 8 |
| Maximum height of the display plane | 6 |

Numerical Example 9
Unit mm

| Surface Number | r | d | nd | vd |
|---|---|---|---|---|
| 1 (Display plane) | INF | 5.5000 | | |
| 2 | INF | 2.0000 | 1.58423 | 30.49 |
| 3 | 27.9968 | D1 (Variable) | | |
| 4 | 61.1605 | 5.8573 | 1.53110 | 55.91 |
| 5 | −13.5342 | 0.8785 | | |
| 6 | −11.6382 | 1.5216 | 1.58423 | 30.49 |
| 7 | −25.5625 | 4.2975 | | |
| 8 | −592.1056 | 9.7398 | 1.53110 | 55.91 |
| 9 | −20.7443 | D2 (Variable) | | |
| 10 | INF | 1.0000 | 1.49236 | 57.86 |
| 11 | INF | 10.6300 | | |
| 12 (Virtual stop) | INF | | | |

Variable spacing data

| Diopter | −1.0 | +4.0 | −4.0 |
|---|---|---|---|
| D1 | 7.8088 | 11.1625 | 5.7215 |
| D2 | 10.7827 | 7.4291 | 12.8701 |

Various data 1

| Diopter | −1.0 | +4.0 | −4.0 |
|---|---|---|---|
| Angle of field | 23.1294 | 23.2998 | 22.6440 |
| Focal length | 30.0681 | 27.8113 | 31.6674 |

Various data 2

| | |
|---|---|
| F1 | −47.9208 |
| FR | 25.9321 |
| Total length | 49.3863 |
| Pupil diameter | 8 |
| Maximum height of the display plane | 6 |

Numerical Example 10
Unit mm

| Surface Number | r | d | nd | vd |
|---|---|---|---|---|
| 1 (Display plane) | INF | 4.5800 | | |
| 2 | INF | 2.0000 | 1.58423 | 30.49 |
| 3 | 22.2620 | D1 (Variable) | | |
| 4 | 17.7905 | 5.6714 | 1.53110 | 55.91 |
| 5 | −22.7666 | 1.5000 | | |
| 6 | −12.9245 | 1.8577 | 1.58423 | 30.49 |
| 7 | −32.6162 | 2.6886 | | |
| 8* | 79.7355 | 6.4027 | 1.53110 | 55.91 |
| 9 | −22.8062 | D2 (Variable) | | |
| 10 | INF | 1.0000 | 1.49236 | 57.86 |
| 11 | INF | 10.6300 | | |
| 12 (Virtual stop) | INF | | | |

Aspheric data

8$^{th}$ surface

K = −0.0081
A4 = 3.9762E−06
A6 = 1.0901E−06
A8 = 2.2950E−09

Variable spacing data

| Diopter | −1.0 | +4.0 | −4.0 |
|---|---|---|---|
| D1 | 8.6387 | 10.9252 | 7.2114 |
| D2 | 5.4646 | 3.1781 | 6.8918 |

Numerical Example 10
Various data 1

| Diopter | −1.0 | +4.0 | −4.0 |
|---|---|---|---|
| Angle of field | 28.6339 | 28.2611 | 28.6604 |
| Focal length | 25.1448 | 23.4957 | 26.2970 |

Various data 2

| | |
|---|---|
| F1 | −38.1048 |
| FR | 21.4969 |
| Total length | 39.8036 |
| Pupil diameter | 8 |
| Maximum height of the display plane | 6 |

Numerical Example 11
Unit mm

| Surface Number | r | d | nd | vd |
|---|---|---|---|---|
| 1 (Display plane) | INF | 4.0000 | | |
| 2 | INF | 2.6852 | 1.58423 | 30.49 |
| 3 | 34.9953 | D1 (Variable) | | |
| 4 | −48.1216 | 6.8940 | 1.53110 | 55.91 |
| 5 | −27.6678 | 6.1908 | | |
| 6 | −13.9656 | 2.6442 | 1.58423 | 30.49 |
| 7 | −17.2889 | 5.5842 | | |
| 8 | 48.7929 | 8.7617 | 1.53110 | 55.91 |
| 9 | −36.0302 | D2 (Variable) | | |
| 10 | INF | 1.0000 | 1.49236 | 57.86 |
| 11 | INF | 10.6300 | | |
| 12 (Virtual stop) | INF | | | |

Variable spacing data

| Diopter | −1.0 | +4.0 | −4.0 |
|---|---|---|---|
| D1 | 8.0665 | 14.5327 | 4.2578 |
| D2 | 19.7199 | 13.2538 | 23.5287 |

Various data 1

| Diopter | −1.0 | +4.0 | −4.0 |
|---|---|---|---|
| Angle of field | 17.7557 | 17.0380 | 17.6436 |
| Focal length | 39.7743 | 35.4817 | 42.8262 |

Various data 2

| | |
|---|---|
| F1 | −59.8999 |
| FR | 35.4900 |
| Total length | 65.5466 |
| Pupil diameter | 8 |
| Maximum height of the display plane | 6 |

Numerical Example 12
Unit mm

| Surface Number | r | d | nd | vd |
|---|---|---|---|---|
| 1 (Display plane) | INF | 7.0000 | | |
| 2 | INF | 2.0000 | 1.58423 | 30.49 |
| 3 | 34.9957 | D1 (Variable) | | |
| 4 | −241.3176 | 5.7811 | 1.53110 | 55.91 |

Numerical Example 12
Unit mm

| | | | | |
|---|---|---|---|---|
| 5 | −19.0008 | 3.7213 | | |
| 6 | −10.5871 | 2.4748 | 1.58423 | 30.49 |
| 7 | −29.5247 | 1.9803 | | |
| 8 | −440.8891 | 5.7507 | 1.53110 | 55.91 |
| 9 | −14.5043 | D2 (Variable) | | |
| 10 | INF | 1.0000 | 1.49236 | 57.86 |
| 11 | INF | 10.6300 | | |
| 12 (Virtual stop) | INF | | | |

Various spacing data

| Diopter | −1.0 | +4.0 | −4.0 |
|---|---|---|---|
| D1 | 10.3832 | 16.6029 | 7.1492 |
| D2 | 7.4948 | 1.2751 | 10.7288 |

Various data 1

| Diopter | −1.0 | +4.0 | −4.0 |
|---|---|---|---|
| Angle of field | 18.0301 | 16.1973 | 18.6612 |
| Focal length | 39.5447 | 35.2847 | 42.1936 |

Various data 2

| | |
|---|---|
| F1 | −59.9006 |
| FR | 35.4900 |
| Total length | 47.5862 |
| Pupil diameter | 8 |
| Maximum height of the display plane | 6 |

Numerical Example 13
Unit mm

| Surface Number | r | d | nd | vd |
|---|---|---|---|---|
| 1 (Display plane) | INF | 3.5000 | | |
| 2 | INF | 1.9967 | 1.58423 | 30.49 |
| 3 | 18.0186 | D1 (Variable) | | |
| 4 | 14.6969 | 5.4237 | 1.53110 | 55.91 |
| 5* | −19.2710 | 2.9907 | | |
| 6* | −10.1046 | 1.7455 | 1.58423 | 30.49 |
| 7* | −66.4423 | 0.9051 | | |
| 8* | 43.7265 | 5.3714 | 1.53110 | 55.91 |
| 9 | −12.0434 | D2 (Variable) | | |
| 10 | INF | 1.0000 | 1.49236 | 57.86 |
| 11 | INF | 10.6300 | | |
| 12 (Virtual stop) | INF | | | |

Aspheric data $5^{th}$ surface

K = −0.0755
A4 = 9.2249E−05
A6 = −1.9828E−06
A8 = 4.0825E−08

$6^{th}$ surface

K = −0.1693
A4 = 1.5163E−05
A6 = 1.2900E−06
A8 = 3.2569E−08

$7^{th}$ surface

K = −0.9606
A4 = 1.0146E−05
A6 = 1.7329E−07
A8 = 6.3707E−09

$8^{th}$ surface

K = −6.1723
A4 = −2.9209E−05
A6 = −1.7544E−06
A8 = 1.3459E−08

Variable spacing data

| Diopter | −1.0 | +4.0 | −4.0 |
|---|---|---|---|
| D1 | 5.0018 | 6.5097 | 4.0652 |
| D2 | 2.2288 | 0.7200 | 3.1654 |

Various data 1

| Diopter | −1.0 | +4.0 | −4.0 |
|---|---|---|---|
| Angle of field | 34.6751 | 34.6840 | 34.3935 |
| Focal length | 20.4080 | 19.3070 | 21.1574 |

Various data 2

| | |
|---|---|
| F1 | −30.8416 |
| FR | 17.4975 |
| Total length | 30.1637 |
| Pupil diameter | 8 |
| Maximum height of the display plane | 6 |

Numerical Example 14
Unit mm

| Surface Number | r | d | nd | vd |
|---|---|---|---|---|
| 1 (Display plane) | INF | 3.7881 | | |
| 2 | 103.8765 | 6.5018 | 1.53110 | 55.91 |
| 3 | −40.3148 | D1 (Variable) | | |
| 4* | 27.4437 | 6.1971 | 1.53110 | 55.91 |
| 5 | −29.0657 | D2 (Variable) | | |
| 6 | INF | 1.0000 | 1.49236 | 57.86 |
| 7 | INF | 10.6300 | | |
| 8 (Virtual stop) | INF | | | |

Aspheric data $4^{th}$ surface

K = 0.1583
A4 = −2.1706E−04
A6 = 3.3621E−06
A8 = −1.7653E−08

Variable spacing data

| Diopter | −1.0 | +2.6 | −3.8 |
|---|---|---|---|
| D1 | 15.7485 | 18.5898 | 13.6760 |
| D2 | 3.0413 | 0.2001 | 5.1139 |

Various data 1

| Diopter | −1.0 | +2.6 | −3.8 |
|---|---|---|---|
| Angle of field | 27.0124 | 26.1948 | 27.3803 |
| Focal length | 23.9138 | 25.0215 | 23.1658 |

Various data 2

| | |
|---|---|
| F1 | 55.5537 |
| FR | 27.6293 |

-continued

Numerical Example 14
Unit mm

| | |
|---|---|
| Total length | 36.2769 |
| Pupil diameter | 8 |
| Maximum height of the display plane | 6 |

Set out below are the values of conditions (A) and (B) in Examples 7 to 14.

| | Example 7 | Example 8 | Example 9 | Example 10 |
|---|---|---|---|---|
| Condition (A) | 0.318 | 0.246 | 0.628 | 0.660 |
| Condition (B) | 15.748 | 14.860 | 8.713 | 8.319 |
| | Example 11 | Example 12 | Example 13 | Example 14 |
| Condition (A) | 0.664 | 0.660 | 0.662 | 0.430 |
| Condition (B) | 14.975 | 8.557 | 8.811 | 14.657 |

Figure 29:
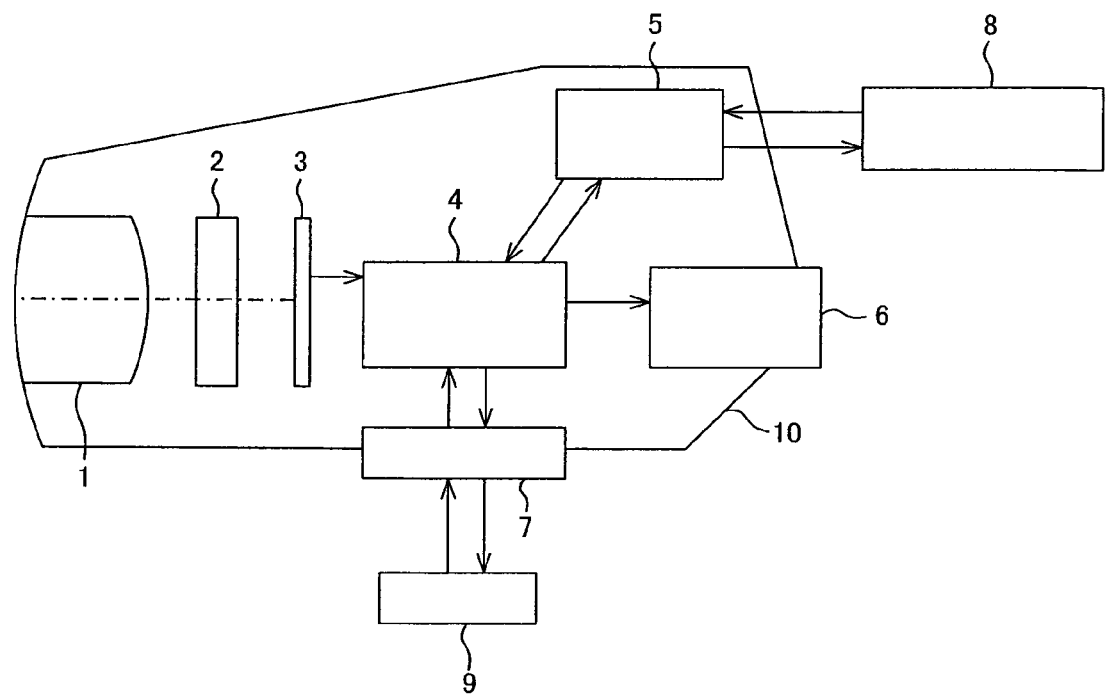
FIG. 29 is illustrative of an imaging apparatus incorporating the inventive eyepiece optical system and electronic view finder.

FIG. 29 is illustrative of the arrangement of a digital camera that is one example of the imaging apparatus incorporating the eyepiece optical system and electronic view finer according to the first, and the second aspect of the invention. Referring to FIG. 29, reference numeral 10 stands for an imaging apparatus or digital camera made up of an imaging optical system 1, a filter 2, an imaging device 3, a controller 4, a built-in memory 5, an electronic view finder 6, and an interface 7.

In the aforesaid imaging apparatus, the imaging optical system 1 is constructed of a plurality of lens elements (lenses, etc.). Light from an object is collected by this imaging optical system 1, and an object image is formed at this position of collection. There is an imaging device 3 such as a CCD (light reception plane) installed at that position of collection. The imaging device 3 is comprised of an assembly of regularly lined up photoelectric elements. To prevent occurrence of the moir phenomenon, the filter 2 having the low-pass effect is interposed between the imaging optical system 1 and the imaging device 3. To cut out infrared light, an infrared cut filter may also be provided.

A light beam incident on the imaging device 3 is converted by the photoelectric elements into electric (video) signals that are in tern entered into the controller 4, where signal processing such as gamma correction and image compression is applied to the electric signals. The electric signals subjected to signal processing are then sent out to a personal computer 9 via the built-in memory 5 and interface 7.

The electronic view finder 6 is built up of an illumination system and an image display device (not shown in FIG. 29), an eyepiece optical system (eyepiece lens), etc. For the eyepiece optical system here, the eyepiece optical system and electronic view finder according to the invention are used. The image display device is located at the display plane, and controlled by the controller 4.

It is thus possible for a viewer to view an object image to be taken or the taken image via the electronic view finder 6. It is also possible to send image data from the built-in memory 5 to an ancillary memory 8. On the other hand, it is possible to send the same image data from the interface 7 to the personal computer 9.

While the present invention has been explained with reference to some embodiments, it is understood that the invention is never limited to them; embodiments comprising some combinations of them are included in the category of the invention too.

What we claim is:

1. An eyepiece optical system, comprising, in order from an object side to an exit side thereof,
    a first lens group that is a single lens that has positive refracting power and is in a meniscus configuration concave on its object side,
    a second lens group that is a single lens that has negative refracting power and is in a meniscus configuration concave on its object side, and
    a third lens group that is a single lens having positive refracting power, wherein:
    a total number of lenses in said eyepiece optical system is 3,
    an object-side concave lens surface in said first lens group is an aspheric surface,
    an object-side concave lens surface in said second lens group is an aspheric surface, and
    an exit-side lens surface in said third lens group is an aspheric surface.

2. The eyepiece optical system according to claim 1, wherein during diopter adjustment, said second lens group and said third lens group move in unison along an optical axis thereof.

3. The eyepiece optical system according to claim 1, wherein said first lens group satisfies the following condition (1):

$$1.01 \leq (R11+R12)/(R11-R12) \leq 20.0 \qquad (1)$$

where R11 is a radius of curvature of the object-side lens surface in said first lens group, and
    R12 is a radius of curvature of the exit-side lens surface in said first lens group.

4. The eyepiece optical system according to claim 1, wherein said second lens group satisfies the following condition (2):

$$-4.0 \leq (R21+R22)/(R21-R22) \leq -1.01 \qquad (2)$$

where R21 is a radius of curvature of the object-side lens surface in said second lens group, and
    R22 is a radius of curvature of the exit-side lens surface in said second lens group.

5. The eyepiece optical system according to claim 1, wherein said first lens group, said second lens group and said third lens group satisfy the following conditions (3), (4) and (5):

$$1 \leq F1/F \leq 4 \qquad (3)$$

$$-1.4 \leq F2/F \leq -0.4 \qquad (4)$$

$$0.3 \leq F3/F \leq 1 \qquad (5)$$

where F1 is a focal length of said first lens group,
    F2 is a focal length of said second lens group,
    F3 is a focal length of said third lens group, and
    F is a focal length of the whole eyepiece optical system provided that when diopter can be adjusted by movement of any of the lens groups in the eyepiece optical system, F is the focal length of the whole eyepiece optical system at −1 diopter.

6. The eyepiece optical system according to claim 1, wherein said third lens group satisfies the following condition (7):

$$0.1 \leq (R31+R32)/(R31-R3) \leq 0.9 \qquad (7)$$

where R31 is a radius of curvature of the object-side lens surface in said third lens group, and
R32 is a radius of curvature of the exit-side lens surface in said third lens group.

7. An electronic view finder, comprising:
an image display device having a display plane adapted to display an image, and
an eyepiece optical system located on a display plane side of said image display device and adapted to enlarge an image displayed on said display plane, wherein said eyepiece optical system is an eyepiece optical system of claim 1.

8. The electronic view finder according to claim 7, which satisfies the following condition (6):

$$F1/D1 \geq 4.0 \tag{6}$$

where F1 is a focal length of said first lens group, and
D1 is a distance on the optical axis from said first lens group to said display plane.

9. The electronic view finder according to claim 7, which satisfies the following condition (8):

$$-2.0 \leq D12/F12 \text{-} 0.05 \tag{8}$$

where F2 is a focal length of said second lens group, and
D12 is a distance on the optical axis from said first lens group to said second lens group, provided that when said eyepiece optical system can be adjusted for diopter by movement of any one of the first, second and third lens groups, D12 is a distance at −1 diopter.

* * * * *

UNITED STATES PATENT AND TRADEMARK OFFICE
CERTIFICATE OF CORRECTION

PATENT NO.       : 7,978,417 B2                                      Page 1 of 1
APPLICATION NO.  : 12/931126
DATED            : July 12, 2011
INVENTOR(S)      : Akinori Nishio et al.

It is certified that error appears in the above-identified patent and that said Letters Patent is hereby corrected as shown below:

On the title page, item (75), change "Keitaro Yokohama" to --Keitaro Yokoyama--;

On the title page, item (75), delete "Daichi Murakami, Hachioji (JP)".

Signed and Sealed this
Twenty-second Day of November, 2011

David J. Kappos
*Director of the United States Patent and Trademark Office*